(12) United States Patent
Yamagishi

(10) Patent No.: US 7,570,448 B2
(45) Date of Patent: Aug. 4, 2009

(54) WRITE-ONCE TYPE STORAGE APPARATUS, CONTROL METHOD AND RECORD CONTROL CIRCUIT

(75) Inventor: Michinaga Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/501,280

(22) Filed: Aug. 9, 2006

(65) Prior Publication Data

US 2007/0247738 A1    Oct. 25, 2007

(30) Foreign Application Priority Data

Apr. 24, 2006    (JP) .............................. 2006-118875

(51) Int. Cl.
*G11B 21/02*    (2006.01)
*G11B 20/20*    (2006.01)

(52) U.S. Cl. .......................................... 360/75; 360/76

(58) Field of Classification Search ........................ None
See application file for complete search history.

(56) References Cited

U.S. PATENT DOCUMENTS

| 5,854,715 | A | * | 12/1998 | Takagi ......................... 360/53 |
| 5,859,740 | A | * | 1/1999 | Takeda et al. ............. 360/77.02 |
| 5,940,237 | A | * | 8/1999 | Takagi ......................... 360/75 |
| 6,437,947 | B1 | * | 8/2002 | Uno ......................... 360/78.04 |

FOREIGN PATENT DOCUMENTS

JP    2004-095078    3/2004

* cited by examiner

*Primary Examiner*—K. Wong
(74) *Attorney, Agent, or Firm*—Greer, Burns & Crain, Ltd.

(57) ABSTRACT

In a write-once type storage apparatus, a head having a recording element and a recording element is supported at the leading end of a rotary actuator, and information written once in a disk medium by the head is then reproduced. A write processing unit writes information sequentially from a track giving the largest yaw angle of the actuator in the recording track area of the disk medium to a track giving a yaw angle of 0°. For example, the write processing unit writes information sequentially from the outermost track of the disk medium toward a track giving a yaw angle of 0°, and then, writes information sequentially from the innermost track to a track giving a yaw angle of 0°. A read processing unit reads out information write-once-written in the disk medium from a track of a larger yaw angle toward a track of a smaller yaw angle.

12 Claims, 20 Drawing Sheets

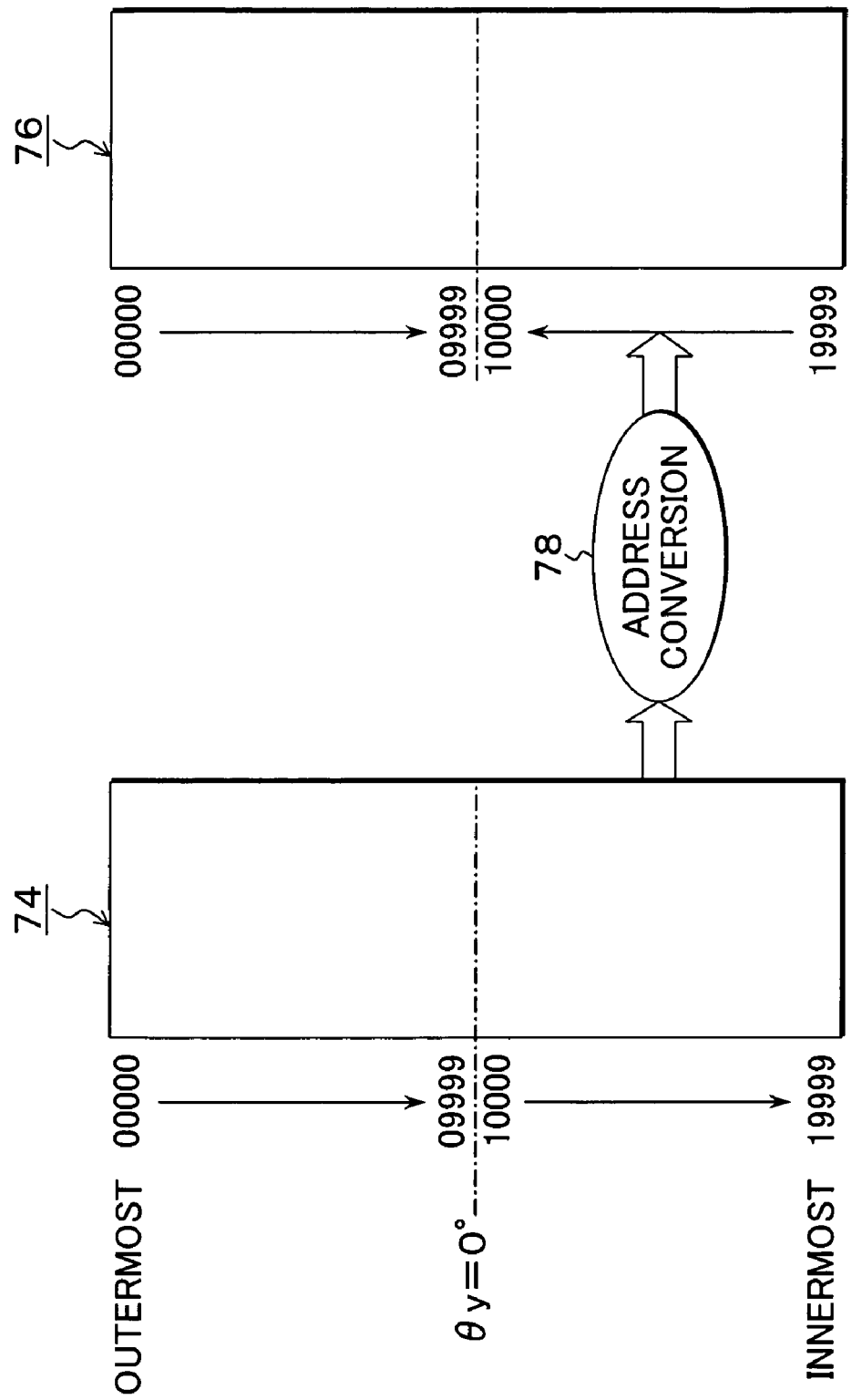

WRITE-ONCE TYPE STORAGE APPARATUS, CONTROL METHOD AND RECORD CONTROL CIRCUIT

This application is a priority based on prior application No. JP 2006-118875 filed Apr. 24, 2006, in Japan

BACKGROUND OF THE INVENTION

1. Field of the Invention

The present invention relates to a write-once type storage apparatus in which information is written once in a disk medium, and then repeatedly reproduced, a control method thereof and a record control circuit therefor. More particularly, the invention relates to a write-once type storage apparatus for which the face recording density is improved through optimization of the track pitch, considering variation of the head recording width dependent upon the yaw angle of a rotary actuator.

2. Description of the Related Art

Conventionally, a write-once type storage apparatus uses an optical disk medium such as a DVD which is a portable storage medium, and in an optical disk drive using an optical disk medium, in general, a linear actuator linearly driving an optical head in a direction crossing the medium track is used as a head actuator.

On the other hand, in a hard disk drive using a magnetic disk medium, positioning of the head is accomplished by using a rotary actuator for the magnetic disk medium. Information can be accessed at random at a position of an arbitrary track or continuously. For such a hard disk drive, one usable as a portable storage medium by housing a magnetic disk medium in a cartridge is known.

More recently, it has come to be used in various devices and apparatuses other than information devices along with the tendencies toward a larger capacity, a smaller size and a lower cost. Among others, optical disk drives such as DVD are used also as write-once type storage apparatus in which a movie or music is once written in, and which are thereafter used exclusively for reproduction.

In the case of a conventional write-once type hard disk drive, it is the usual practice to continuously write information, with the outermost track as the starting track, in a direction toward the inner side in a run of the write processing.

However, in such continuous recording in a single direction in the conventional write-once type storage apparatus, a relatively wide track pitch is usually used in consideration of the head inclination resulting from an increase in the yaw angle of the rotary actuator, and this leads to a problem of impossibility to increase the face recording density of magnetic disk medium.

That is, if a track pitch is selected, depending upon the head width, for example, at a position with a yaw angle of 0° without taking into account the head inclination caused by the yaw angle, the head widens over the track width under the effect of head inclination at a head position where the yaw angle increases on the outer side or on the inner side. A write operation in this state causes the portion sticking out the track width to overwrite the adjacent track, thus destroying information already recorded in the adjacent track and leading to a lower error rate. This may result in impossibility to read out the information.

A wider track width is used to avoid this inconvenience so that an increase in the yaw angle does not interfere in the adjacent track. It is therefore difficult to increase the face recording density by reducing the track pitch over this limit.

SUMMARY OF THE INVENTION

According to the present invention, there are provided a write-once type storage apparatus which permits an increase in the face recording density by reducing the track pitch even upon occurrence of a change in the yaw angle caused by the rotary actuator, a control method thereof and a record control circuit therefor.

(Apparatus)

The present invention provides a write-once type storage apparatus which supports a head having a recording element and a reading element at the leading end of a rotary actuator, and after writing once information by the head into a disk medium, reproduces the once-written information, comprising:

a write processing unit which writes information sequentially from a track for which the yaw angle of the actuator in the recording track area of the disk medium becomes the largest toward a track for which the yaw angle becomes 0°; and a read processing unit which reads out the information write-once-written into the disk medium from a track giving a large yaw angle toward a track giving a decreasing yaw angle.

In the write-once type storage apparatus of the present invention, the write processing unit writes information sequentially from the outermost track of the disk medium toward a track giving a yaw angle of 0°, and then writes information sequentially from the innermost track toward a track giving a yaw angle of 0°.

The write processing unit may write information sequentially from the innermost track of the disk medium toward a track giving a yaw angle of 0°, and then write information sequentially from the outermost track toward a track giving a yaw angle of 0°.

The write processing unit may divide the recording track area of the disk medium into an outer zone and an inner zone with a yaw angle of 0° as a boundary, alternately select sequentially tracks of the outer zone and inner zone and write information from the track giving the largest yaw angle toward a track giving a yaw angle of 0°. More specifically, the write processing unit writes information by selecting a track alternately in the order from the outer zone to the inner zone, or from the inner zone to the outer zone.

When writing information in a vacant track adjacent to an already recorded track, the write processing unit sets a track pitch so as to overwrite the portion sticking out from the recorded track into the vacant track.

(Servo Write)

The present invention provides a servo write unit of a write-once type storage apparatus, in which information once written into a disk medium by a head supported at a leading end of a rotary actuator is then reproduced, comprising:

a track pitch determining unit which determines an optimum value of track pitch of the disk medium;

wherein the track pitch determining unit comprises:

a first processing unit which writes test data into a track of the largest yaw angle;

a second processing unit which writes other test data into a track adjacent to the track of the largest yaw angle;

a third processing unit which reads out the test data of the track of the largest yaw angle and detects an error rate or a number of disagreements; and a fourth processing unit which repeats processes by the first to third processing units while sequentially reducing the track pitch until the error rate or number of disagreements exceeds a prescribed threshold value, and adopting a track pitch at the moment when the error rate or number of disagreements reaches the threshold value or immediately before such moment as an optimum value.

The track pitch determining unit determines an optimum value of track pitch to be used for recording/reproduction on the outer side for the outermost track and the track adjacent thereto, and determines an optimum value of track pitch to be used for recording/reproduction on the inner side for the innermost track and the track adjacent thereto.

(Method)

The present invention provides a control method of a write-once type storage apparatus which supports a head having a recording element and a reading element on a leading end of an actuator, and after once writing information into a disk medium by the head, the information is reproduced, comprising:

a write processing step of writing information sequentially from a track giving the largest yaw angle of the actuator in the recording track area of the disk medium to a track giving a yaw angle of 0°; and a read processing step of reading out the information write-once-written in the disk medium from the track of a larger yaw angle to the track of a decreasing yaw angle.

The present invention provides a servo write method of a write-once type storage apparatus in which information once written into a disk medium by a head supported at a leading end of a rotary actuator is then reproduced, comprising:

a track pitch determining step of determining an optimum value of track pitch of the disk medium;

wherein the track pitch determining step comprises:

a first processing step of writing test data into a track of the largest yaw angle;

a second processing step of writing other test data into a track adjacent to the track of the largest yaw angle;

a third processing step of reading out the test data of the track of the largest yaw angle and detecting an error rate or number of disagreements; and a fourth processing step of repeating processes in the first to third processing steps while sequentially reducing the track pitch until the error rate or number of disagreements exceeds a prescribed threshold value, and adopting a track pitch at the moment when the error rate or number of disagreements reaches the threshold value or immediately before such moment as an optimum value.

(Circuit)

The present invention provides a record control circuit which controls information recording on a disk medium by a head supported by a rotary actuator, comprising:

a write processing unit which writes information sequentially from a track giving the largest yaw angle of the actuator in the recording track area of the disk medium to a track giving a yaw angle of 0°; and a read processing unit which reads out the information write-once-written in the disk medium from the track of a larger yaw angle to the track of a decreasing yaw angle.

[Advantages]

According to the present invention, by continuously performing a run of recording into the disk medium in a sequence from a track giving the largest yaw angle (the outermost track or the innermost track) toward a track giving a yaw angle of 0°, a stick-out portion which may be caused by the occurrence of a yaw angle in the adjacent track can be overwritten in a continuous write in a direction, thereby permitting improvement of the track density by reducing the track pitch and increase the face recording density of the disk medium.

The above and other objects, features, and advantages of the present invention will become more apparent from the following detailed description with reference to the drawings.

BRIEF DESCRIPTION OF THE DRAWINGS

FIG. 8 is a descriptive view of address conversion used in write-once type write and write-once type read in this embodiment;

DETAILED DESCRIPTION OF THE PREFERRED EMBODIMENTS

Figure 1:
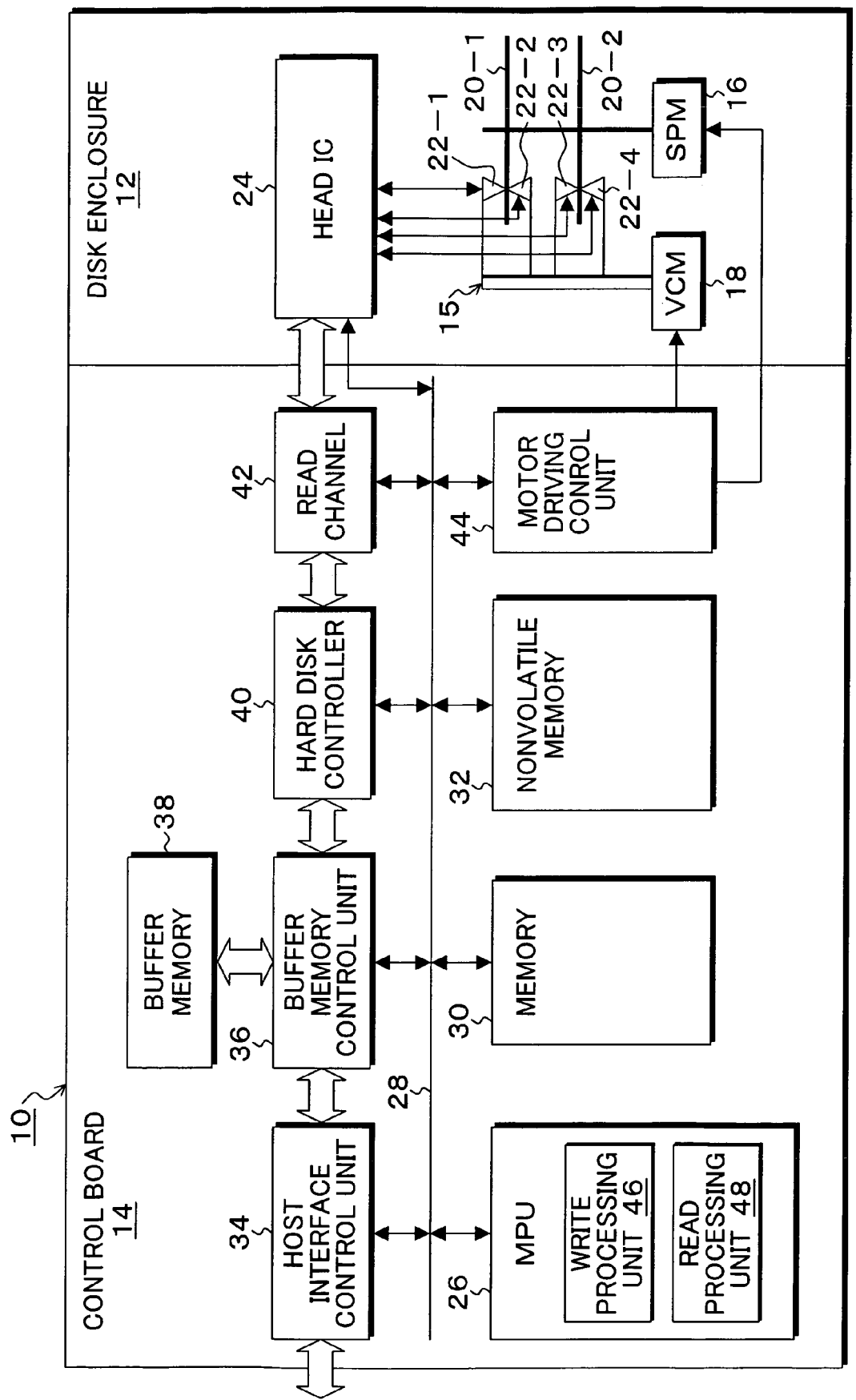
FIG. 1 is a block diagram illustrating an embodiment of the write-once type storage apparatus of the present invention.

FIG. 1 is a block diagram of the write-once type storage apparatus to which the present invention is applied. In FIG. 1, the write-once storage apparatus 10 known as a write-once type hard disk device (HDD) comprises a disk enclosure 12 and a control board 14. A spindle motor 16 is provided in the disk enclosure 12. Magnetic disks (disk media) 20-1 and 20-2 are attached to the rotation shaft of the spindle motor 16 and are caused to rotate for a certain period of time, for example, at 4,200 rpm. A rotary actuator 15 is provided in the disk enclosure 12. A voice coil motor 18 is provided in the rotary actuator 15. The voice coil motor 18 has heads 22-1 to 22-4 mounted on the leading ends of an arm, to perform positioning of the heads relative to the recording surface of disk media 20-1 and 20-2. A write head element (recording element) and a read head element (reading element) are integrally mounted on the heads 22-1 and 22-2. Magnetic recording by the heads 22-1 to 22-4 corresponding to the magnetic disks 20-1 and 20-2 may be accomplished by longitudinal magnetic recording or perpendicular magnetic recording. The heads 22-1 and 22-2 are connected to the head IC 24 via signal lines. Upon receipt of a head select signal based on the write command or the read command from the host serving as a higher-level apparatus, the head IC 24 selects a head and performs write for a run of write-once recording or read to be repeated after write-once recording. A write amplifier is provided for the write system and a preamplifier is provided for the read system in the head IC 24. An MPU 26 is provided on the control board 14. A control program using a RAM, a memory 30 storing control data, and a nonvolatile memory 32 storing the control program using a FROM or the like are provided for a bus 28 of the MPU 26. In addition, the bus 28 of the MPU 26 has a host interface control unit 34, a buffer memory control unit 36 controlling the buffer memory 38, a hard disk controller 40 functioning as a format, a read channel 42 functioning as a write modulating unit and a read demodulating unit, and a motor driving control unit which controls the voice coil motor 18 and the spindle motor 16. The MPU 26 has a write processing unit 46 and a read processing unit 48 as functions implemented by program control corresponding to the write-once type storage apparatus 10 of this embodiment. In the write-once type storage apparatus of this embodiment, heads 22-1 to 22-4 each having a write head element and a read head element are supported on a leading end of the rotary actuator 15. Any one of the heads is selected by a head IC from among the heads 22-1 to 22-4; and data is once written onto recording surfaces corresponding to magnetic disks 20-1 and 20-2 and then repeatedly reproduced. The write processing unit 46 of this write-once type storage apparatus 10 writes data sequentially from a track giving a largest yaw angle of the rotary actuator 15 in the recording track area on each recording surface of the magnetic disks 20-1 and 20-2 toward a track giving a yaw angle of 0°. In this embodiment, the write processing unit 46 writes data sequentially from, for example, the outermost track on the recording surfaces of the magnetic disks 20-1 and 20-2 toward a track giving a yaw angle of 0°, and then writes data from the innermost track toward a track giving a yaw angle of 0°. The read processing unit 48 reads out the write-once-written data from a track of a larger yaw angle toward a track of a smaller yaw angle from the recording surfaces of the magnetic disks 20-1 and 20-2 onto which the first run of write has been conducted by the write processing unit 46.

Figure 2:
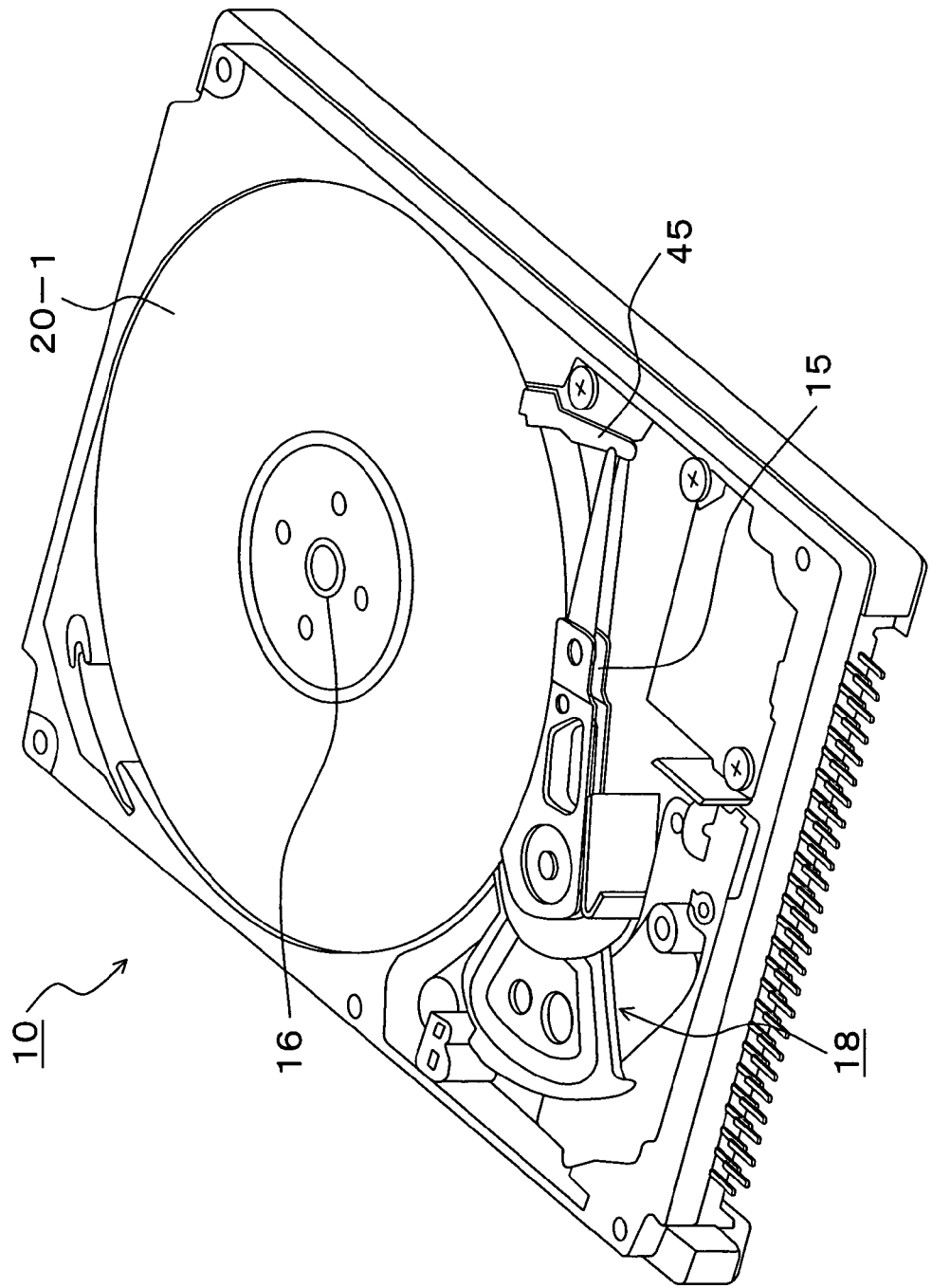
FIG. 2 is a descriptive view of FIG. 1.

FIG. 2 is a structure descriptive view of the write-once type storage apparatus shown in FIG. 1. In FIG. 2, the write-once type storage apparatus 10 has magnetic disks 20-1 and 20-2 attached to the rotation shaft of the spindle motor 16 provided in an enclosure of the unit, and causes the disks to rotate at a constant speed. The rotary actuator 15 is provided on a side of the magnetic disks 20-1 and 20-2. The rotary actuator 15 is revolved by the voice coil motor 18. At the stop position, it moves the heads mounted on the leading end supported by a ramp mechanism 47 in a floating state above the recording surfaces of the magnetic disks 20-1 and 20-2, to perform write or read of data to or from the recording surfaces.

Figure 3:
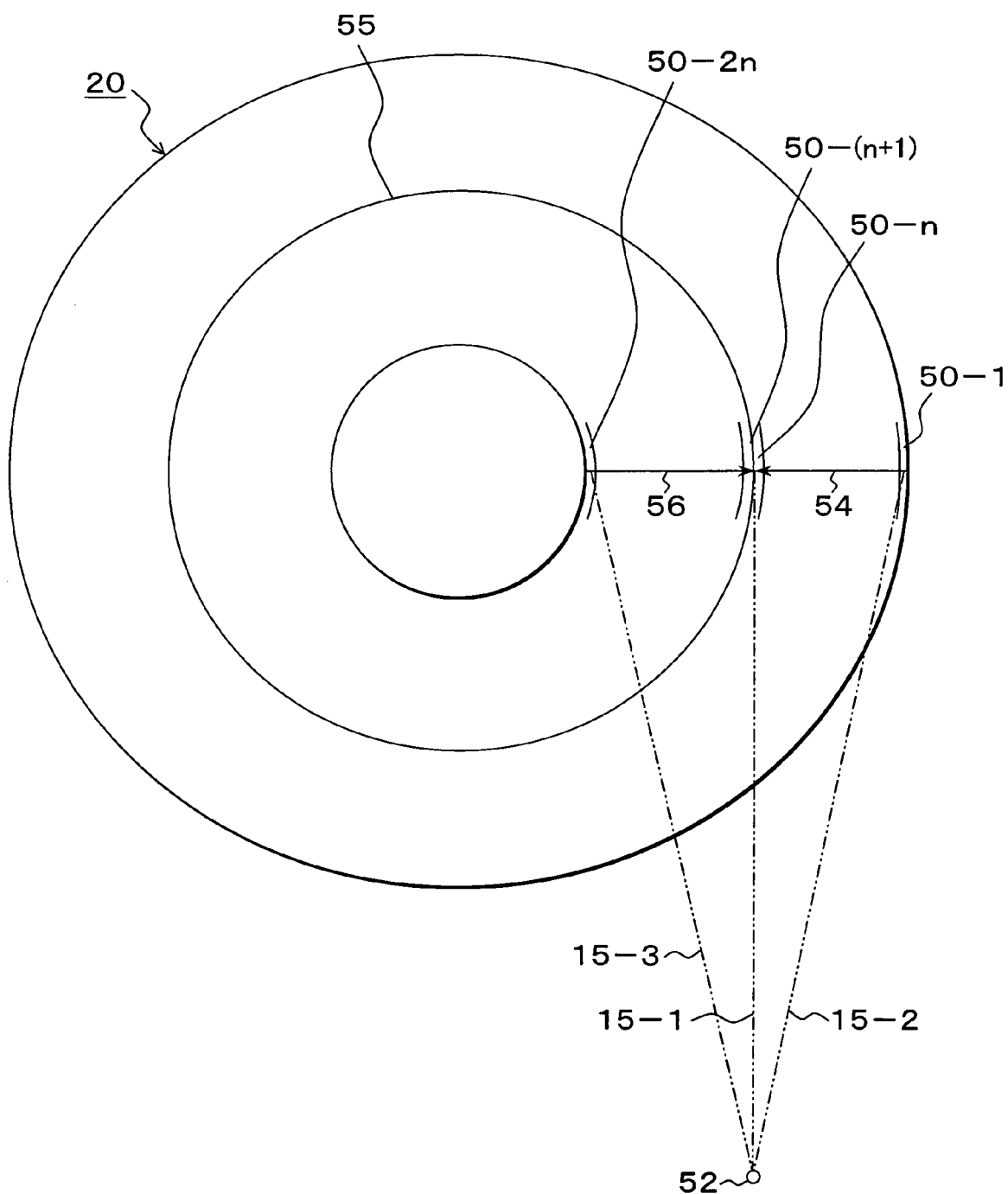
FIG. 3 is a descriptive view of the write-once type write processing onto a magnetic disk in this embodiment.

FIG. 3 is a descriptive view of write-once type write processing onto the magnetic disks in this embodiment. In FIG. 3, the rotary actuator 15 schematically shown revolves around a revolving center 52 over the user recording track area of the magnetic disk 20, and can position the head at the top at any arbitrary track position. On the assumption that the position of a yaw angle of $\theta y=0°$ where the axial line of the rotary actuator 15 agrees with the track direction of the magnetic disk 20 is defined as the 0° yaw angle boundary line 55, the yaw angle $\theta y$ increases according as the position advances further on the outer side or the inner side, and the yaw angle $\theta y$ takes the maximum value at the outermost track 50-1 and at the innermost track 50-2n. In write-once recording in this embodiment, with, for example, the outermost track 50-1 giving the largest yaw angle as the starting position, data are written sequentially toward the track 50-n adjacent to the 0° yaw angle boundary line 55 giving a yaw angle of 0°. Then, data are written sequentially from the innermost track 50-2n when the yaw angle is the largest toward the track 50-(n+1) adjacent to the 0° yaw angle boundary line 55.

Figure 4A:
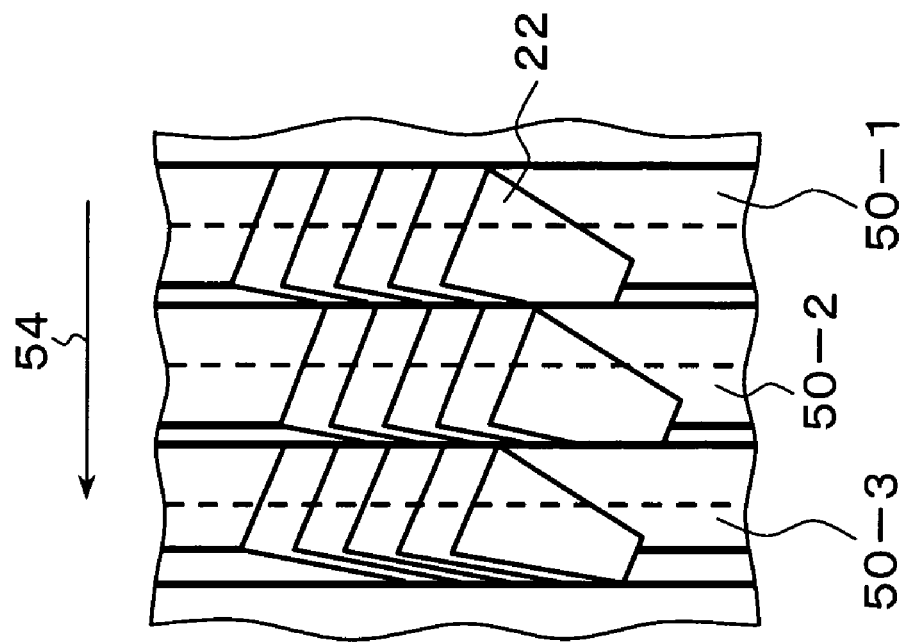
FIGS. 4A and 4B are descriptive views of track write processing for overwriting head stick-out portion caused by the yaw angle in this embodiment.
Figure 4B:
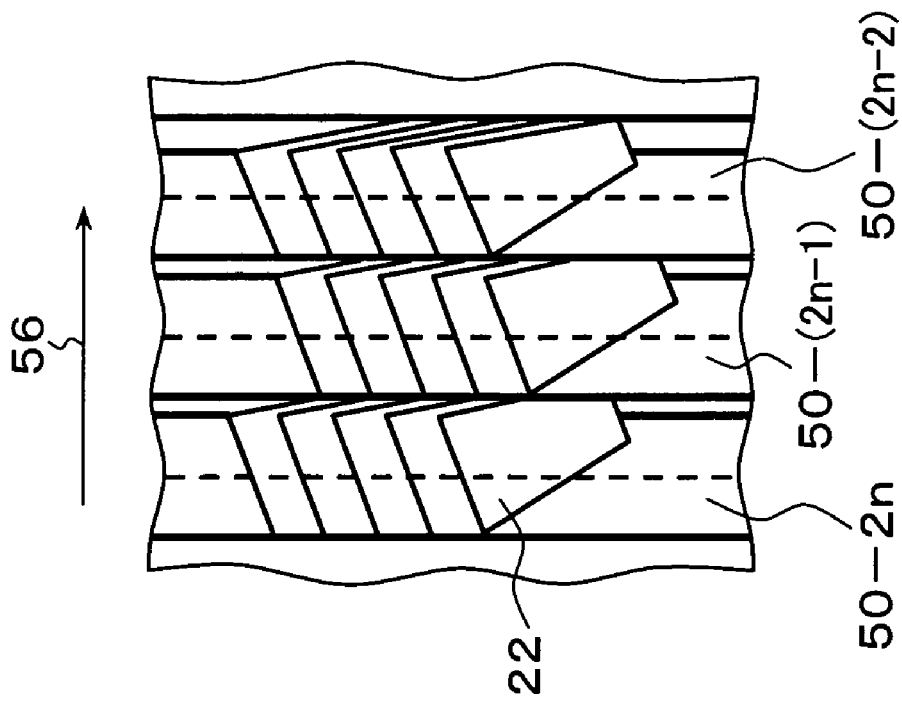

FIGS. 4A and 4B are descriptive views of track writing processing for overwriting a head stick-out portion caused by the yaw angle in the write-once type write processing in this embodiment. FIG. 4A represents write on the innermost track side, and FIG. 4B represents write on the outermost track side. Write on the innermost side shown in FIG. 4A is taken up here as an example. When the head 22 is positioned at the innermost track 50-2n, the yaw angle of the rotary actuator 15 is the largest at this moment, resulting in the largest inclination of the head 22. As a result of this inclination of the head 22, a part of the head 22 sticks out over the adjacent track 50-(2n−1) across the track width. In this embodiment, a track pitch is set so that the stick-out portion of the head 22 caused by the yaw angle is overwritten upon write of the adjacent track 50-(2n−1). When writing into the track 50-(2n−1) as well, a part of the head 22 sticks out onto the track 50(2n−2), and the stick-out portion is overwritten upon writing into the track 50-(2n−2). As a result, while it is the conventional practice to set a slightly wider track pitch so that the stick-out portion caused by the inclination of the head 22 resulting from the yaw angle does not enter the adjacent track, a track pitch is determined, in this embodiment, so as to overwrite the stick-out portion of the adjacent track. This makes it possible to reduce the track pitch in write-once recording, and hence, to increase the track density of the magnetic disk and considerably improve the face recording density for the recording surface as a whole. This is also the case with the outermost side shown in FIG. 4B. The yaw angle becomes the largest when positioning the head 22 at the outermost track 50-1. A part of the head 22 sticks out over the adjacent track 50-2, and a track pitch is determined so as to write data to overwrite this stick-out portion upon writing into the track 50-2. Similarly, the track pitch can be reduced even upon occurrence of a stick-out portion caused by the yaw angle, permitting increase in the track density and improve the face recording density. As shown in FIG. 4, it is important for improving the face recording density as in this embodiment to determine a track pitch so as to overwrite the stick-out portion through write of the adjacent track while considering the inclination of the head relative to the yaw angle. Such determination of a track pitch is accomplished by writing test data, for example, into the innermost track 50-2n shown in FIG. 4A, then, setting a default track pitch to write other test data into the adjacent track 50-(2n−1), thereafter reading out the test data in the innermost track 50-2n to determine an error rate, repeating write of the test data into two adjacent tracks and processing based on the read data of the error rate while gradually reducing the track pitch until a required error rate threshold value is reached, and adopting the smallest track pitch satisfying the error rate as an optimum track pitch. Such determination of the optimum track pitch is performed during the servo write step in the manufacturing stage of the write-once type storage apparatus.

Figure 5:
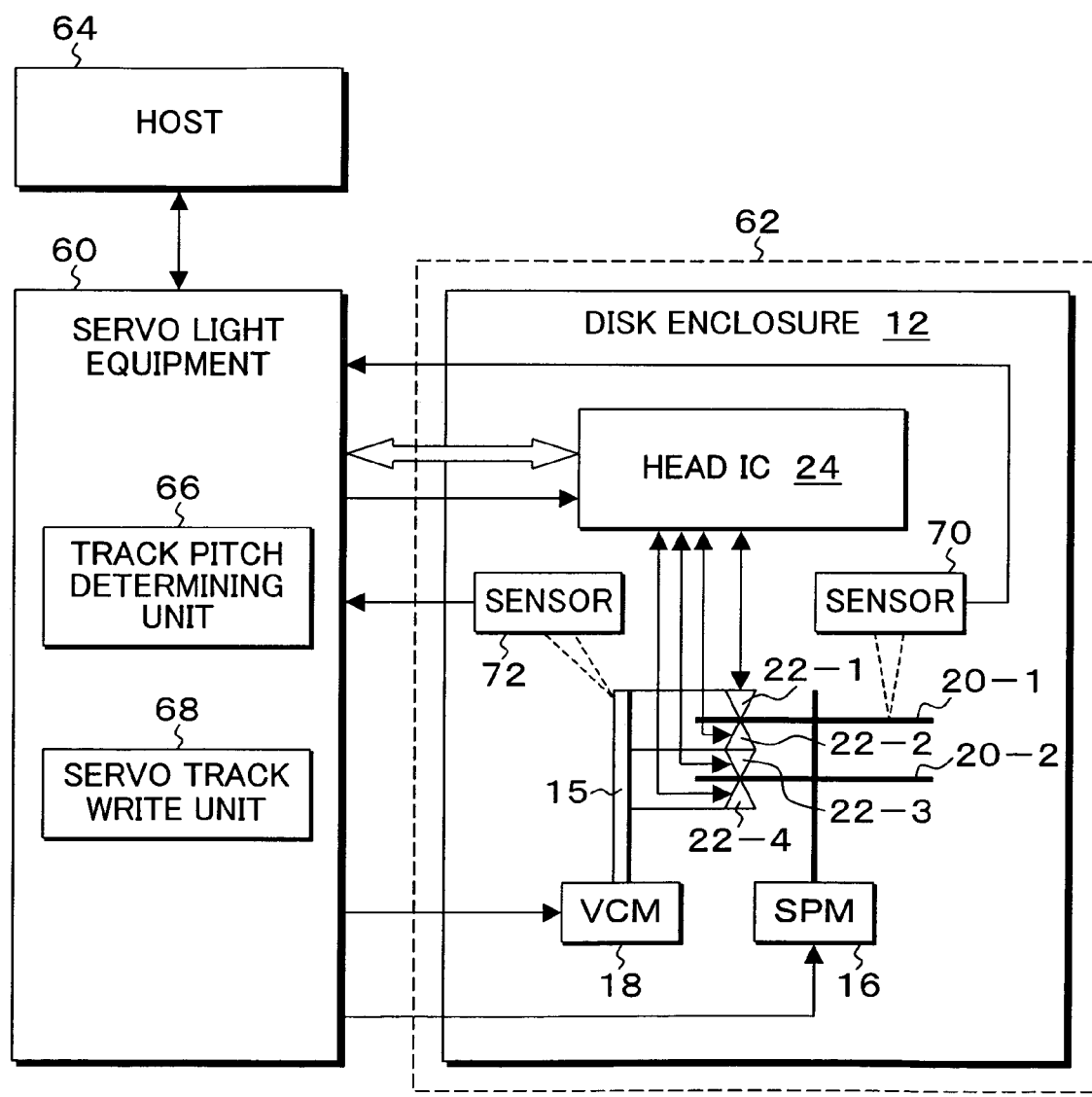
FIG. 5 is a descriptive view of the servo write unit for writing servo tracks on a magnetic disk of this embodiment.

FIG. 5 is a descriptive view of the servo write unit for writing a servo track on the magnetic disk of this embodiment. An optimum track pitch for overwriting the stick-out portion from the head resulting from the yaw angle as shown in FIGS. 4A and 4B is determined to conduct servo track write processing. In FIG. 5, a working bed 62 is provided in the servo write unit 60. The working bed 62 mounts at least an assembly having a structure of the disk enclosure 12 shown in FIG. 1 of the write-once type storage apparatus 10 having the structure shown in FIG. 2. In a state in which the disk enclosure 12 is mounted on the working bed 62, the upper recording surface of the magnetic disk 20-1 serves as a target disk. An encoder scale is formed by pasting or writing of a scale pattern onto the recording surface of the target disk. A non-contact sensor 70 is provided for this encoder scale. The non-contact sensor 70 reads out the encoder scale by irradiation of a laser, outputs a clock signal of a prescribed frequency to the servo write apparatus 60, and generates a clock signal of a format frequency for ensuring synchronization of the write position in the circumferential direction of each recording surface of the magnetic disks 20-1 and 20-2 from the clock signal with the write signal. A non-contact sensor 72 is provided for the rotary actuator 15. The non-contact sensor 72 detects an accurate position of the head in the radial direction caused by the rotary actuator 15, and outputs the result to the servo write apparatus 60. A track pitch determining unit 66 and a servo track write unit 68 are provided in the servo write apparatus 60. The track pitch determining unit 66 determines an optimum position of track pitch for write-once recording for the magnetic disks 20-1 and 20-2. In this embodiment, the track pitch determining unit 66 has the following processing functions:

(1) A first processing unit for writing test data into the track of the largest yaw angle;
(2) A second processing unit for writing other test data into a track adjacent to the track of the largest yaw angle;
(3) A third processing unit for reading out the test data of the track of the largest yaw angle and detecting an error rate or a number of disagreements; and
(4) A fourth processing unit for repeating the processes by the first to the third processing units while gradually reducing the track pitch until a prescribed threshold value is reached by the error rate or the number of disagreements, and adopting a value at the moment when the prescribed threshold value is reached by the error rate or the number of disagreements or immediately before such a moment as an optimum value.

After determination of an optimum track pitch, the servo track write unit 68 receives a format pattern from the host 64 and stores it in the memory. The pattern signals for the individual sectors including the servo frame signal stored in the memory are read out, and the servo track write unit 68 writes the format pattern for each track while moving the head at the determined optimum track pitch.

Figure 6:
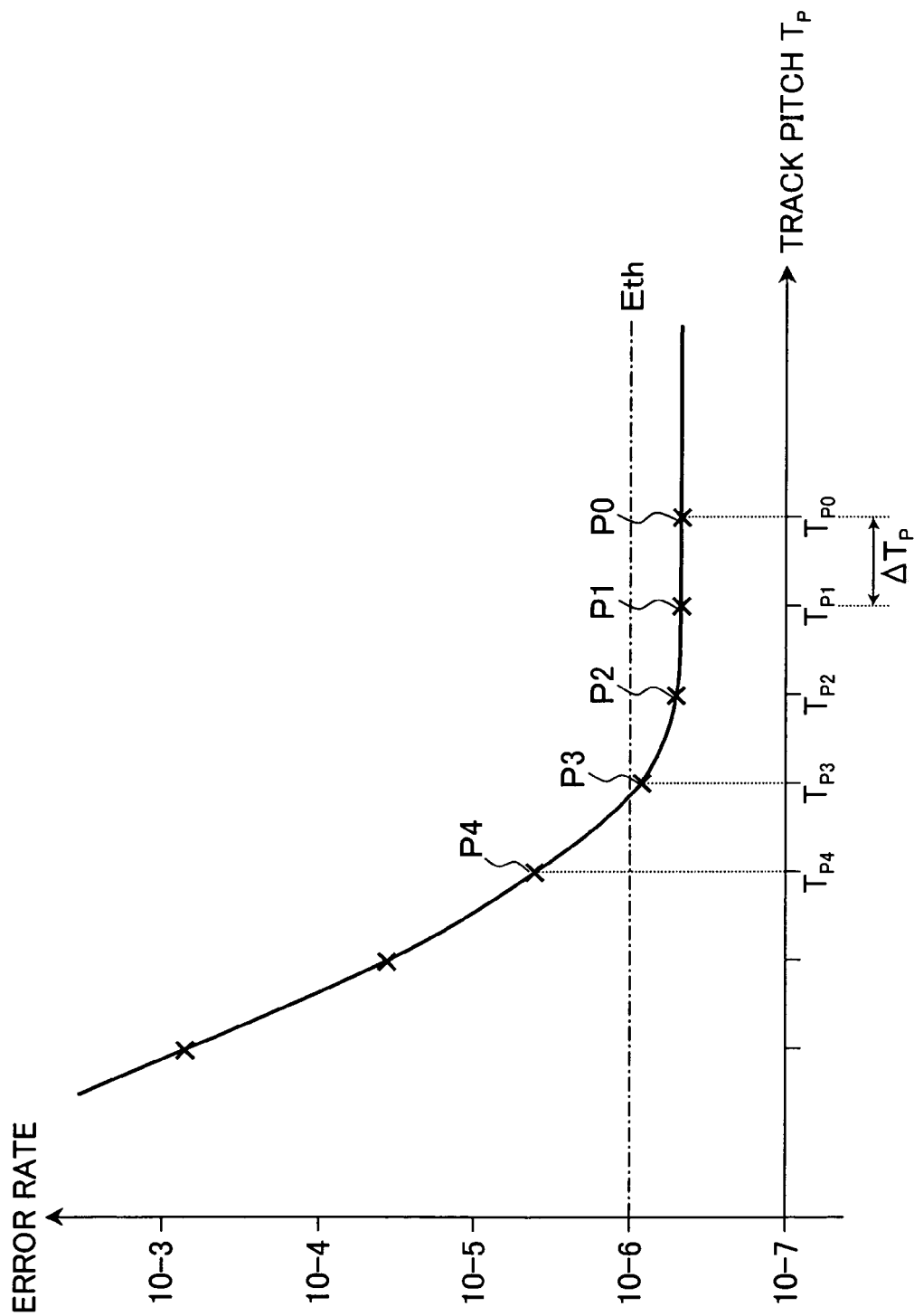
FIG. 6 is a characteristic graph of error rate relative to the track pitch used in the track pitch determining processing of the servo write unit.

FIG. 6 is a characteristic graph of error rate relative to a change in the track pitch used for the track pitch determining process of the servo write apparatus. In FIG. 6, in the track pitch determining processing, a default track pitch TpO is set. A test pattern is written into, for example, the outermost track 50-1 shown in FIG. 4B. After moving the track pitch on the inner side by the default track pitch TpO, other test data is written into the adjacent track 50-2, and the test data written, for example, in the outermost track 50-1, is reversed and the reversed test data is written. Then, the test data of the outermost track 50-1 is read out, and an error rate or the like is calculated. The error rate is assumed here to be at point P0. Since the error rate at this point P0 is smaller than the threshold value Eth, the track pitch Tp=Tp0 is changed into:

$$\Delta Tp = Tp0 - \Delta Tp$$

which is smaller than the track pitch Tp=Tp0 by a prescribed value ΔTp. Similarly, test data is written in the outermost track 50-1 and the adjacent track 50-2, and the test data of the outermost track is read out to determine an error rate. Similarly thereafter, such processing is repeated while sequentially reducing the track pitch Tp by a prescribed value ΔTp until the threshold value Eth is reached by the measured error rate. In the case shown in FIG. 6, following the error rate at point P3, the error rate for point P4 determined by the next test is larger than the threshold value Eth. In this case, therefore, the track pitch for the preceding point P3, i.e., $$Tp = Tp0 - 3\Delta Tp$$

may be adopted as the optimum track pitch.

Figure 7A:
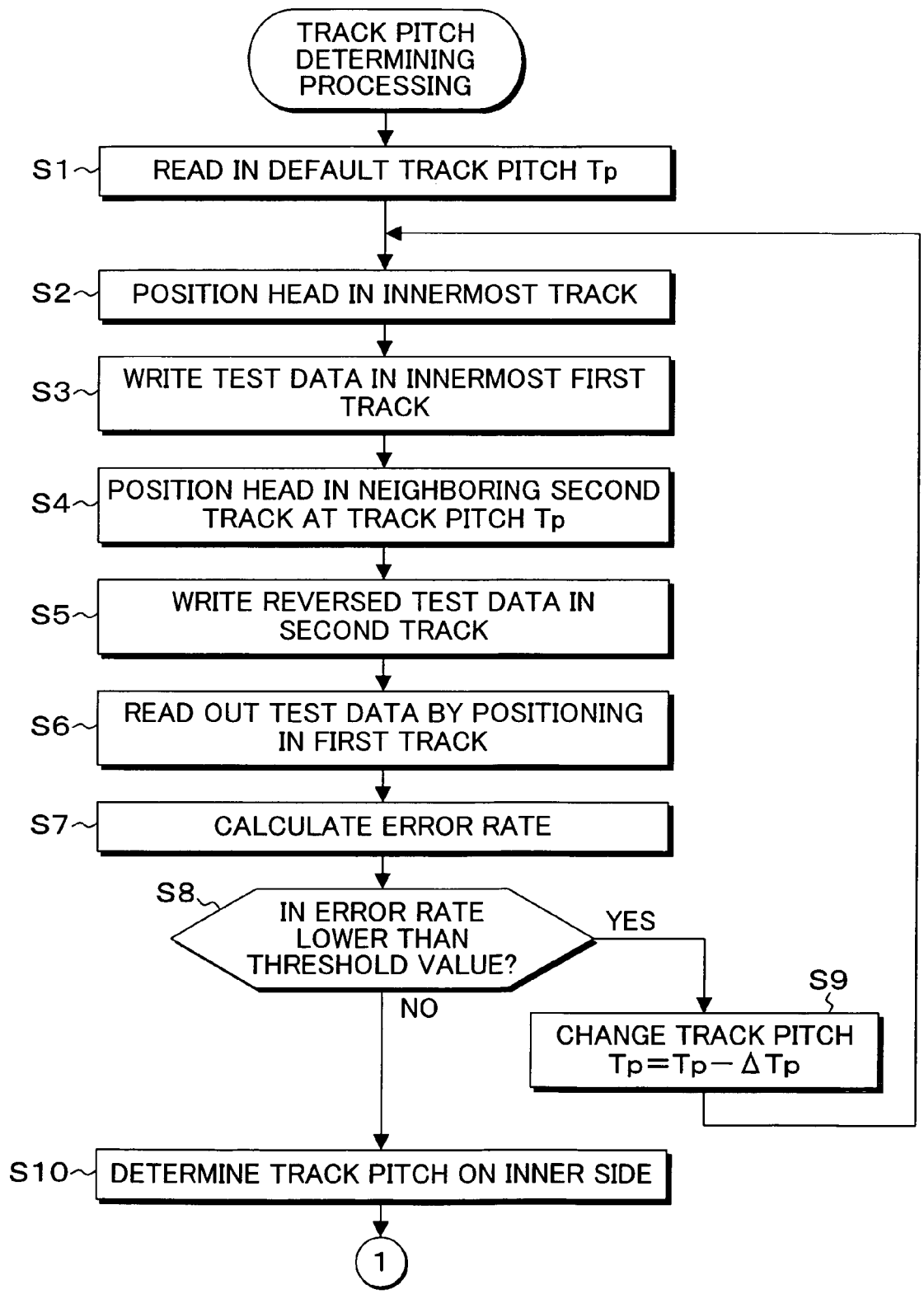
FIGS. 7A and 7B are flowcharts of the track pitch determining processing in the servo write unit.
Figure 7B:
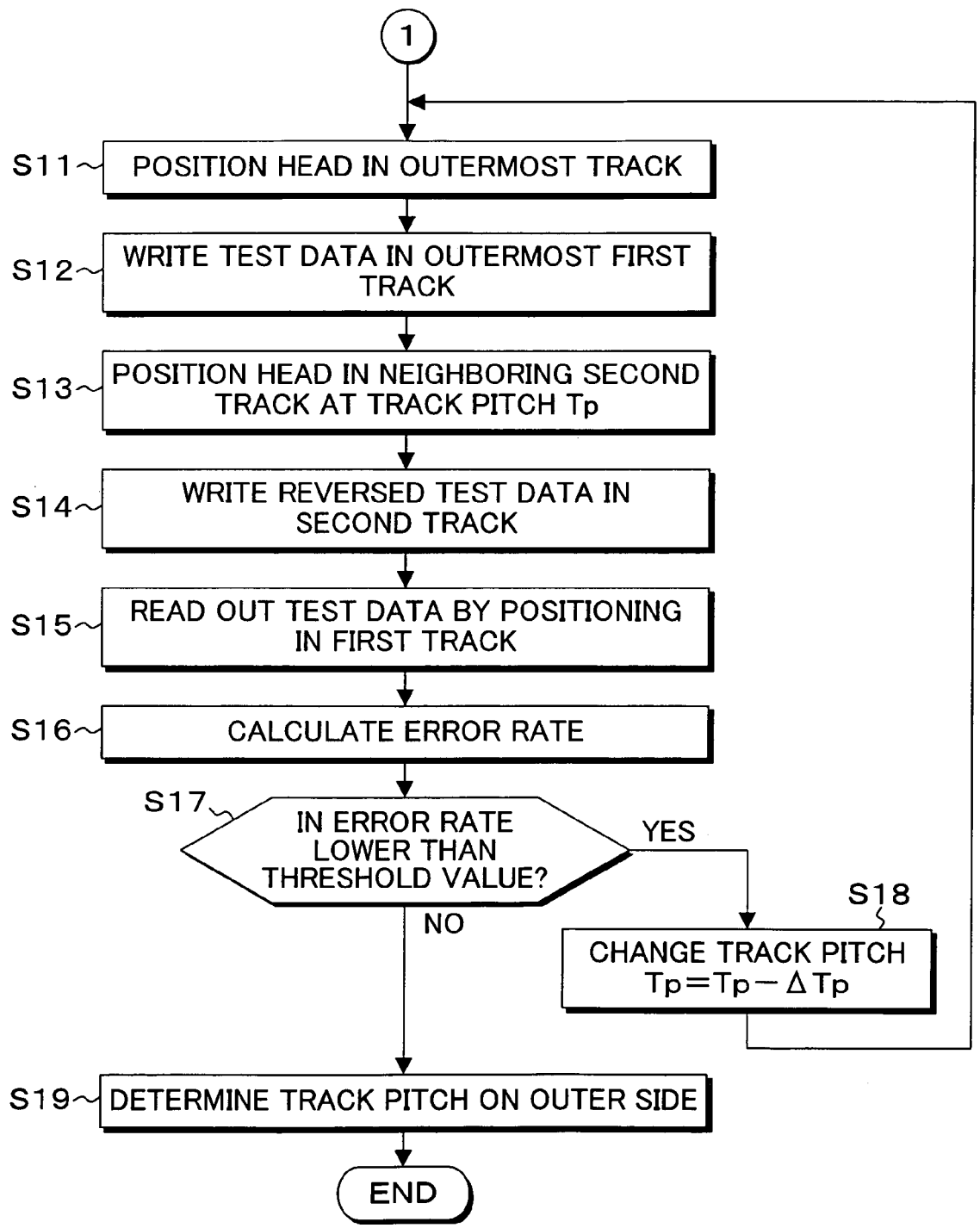

FIGS. 7A and 7B are flowcharts of the track pitch determining process in the servo write apparatus shown in FIG. 5. In FIG. 7A, the track pitch determining processing comprises reading a default track pitch Tp in step S1, then positioning the head in, for example, the innermost track in step S2, and writing test data in the innermost first track in step S3. Then in step S4, the head is positioned at the adjacent second track at a track pitch Tp, and in step S5, for example, reversed test data is written into the second track. Then in step S6, the head is positioned at the first track to read out the test data, and in step S7, an error rate is calculated. If the error rate is smaller than the threshold value in step S8, the track pitch is reduced by Δ Tp in step S9, and the processes in step S2 and the subsequent steps are repeated. When the error rate is over the threshold value in step s8, the process advanced to step S10, and the error rate immediately before becoming over the threshold value is selected as an optimum track pitch. Then in step S11 shown in FIG. 7B, the head is positioned at the outermost track, and in step S12, test data is written into the outermost first track. In step S13, the head is positioned at the adjacent first track at a default track pitch Tp. After writing the reversed test data into the second track in step S14, the test data is read out by positioning the head at the first track in step S15, and in step S16, an error rate is calculated. If the calculated error is smaller than the threshold value in step S17, the process advances to step S18, and a change to reduce the track pitch by ΔTp is conducted. The processes of step S11 and the subsequent steps are repeated. When the error rate is larger than the threshold value in step S17, the process goes to step S19, and a track pitch in the preceding run before becoming over the threshold value is determined as an optimum track pitch. For the write of the test data for determining the track pitch shown in FIGS. 7 and 8, specific sectors in the innermost track and the track adjacent thereto are specified as test sectors, and write and read of the test data are performed by the use of a sector area of a required size. An optimum track pitch may be determined, not limited to the outermost and adjacent tracks, but by repeating a similar processing for the range of a prescribed number of tracks from the outermost track to determine a track pitch, and determining an optimum track pitch as an average value over a plurality of track pitches thus determined.

FIG. 8 is a descriptive view of address conversion used for write-once type write and write-once type read in this embodiment. In FIG. 8, a logical volume 74 is a logical address space managed by an input/output processing unit on the host side serving as a higher-level apparatus of the write-once type storage apparatus 10 of this embodiment. When taking up a magnetic disk as a storage capacity as an example for the simplicity of description, it has an address space corresponding to addresses for 20,000 tracks covering a range from the outermost track address "00000" to the innermost track address "19999." This definition assumes a case where the outer side and the inner side have the same number of tracks of 10,000 with the track position of a yaw angle of 0° as the center in the magnetic disk. In contrast to the logical volume 74 as described above, a physical volume 76 is an address space corresponding to write-one type write of the magnetic disk 20 in which, after writing data sequentially from the outermost track 50-1 to the track 50-n adjacent to the 0° yaw angle boundary line 55, write is performed sequentially from the innermost track 50-2n to the track 50-(n+1) adjacent to the 0° yaw angle boundary line 55. The physical volumes, for the address of the outermost track "00000" to the address of the track adjacent to the yaw angle of 0° to the address of the track adjacent to the yaw angle of 0° "09999", correspond to the logical volumes 74 one to one. For the inner side, in contrast, the track address "10000" adjacent to the yaw angle of 0° of the logical volume 74 corresponds to the address "19999" of the innermost track of the physical volume 76, thus requiring address conversion 78.

Figure 9:
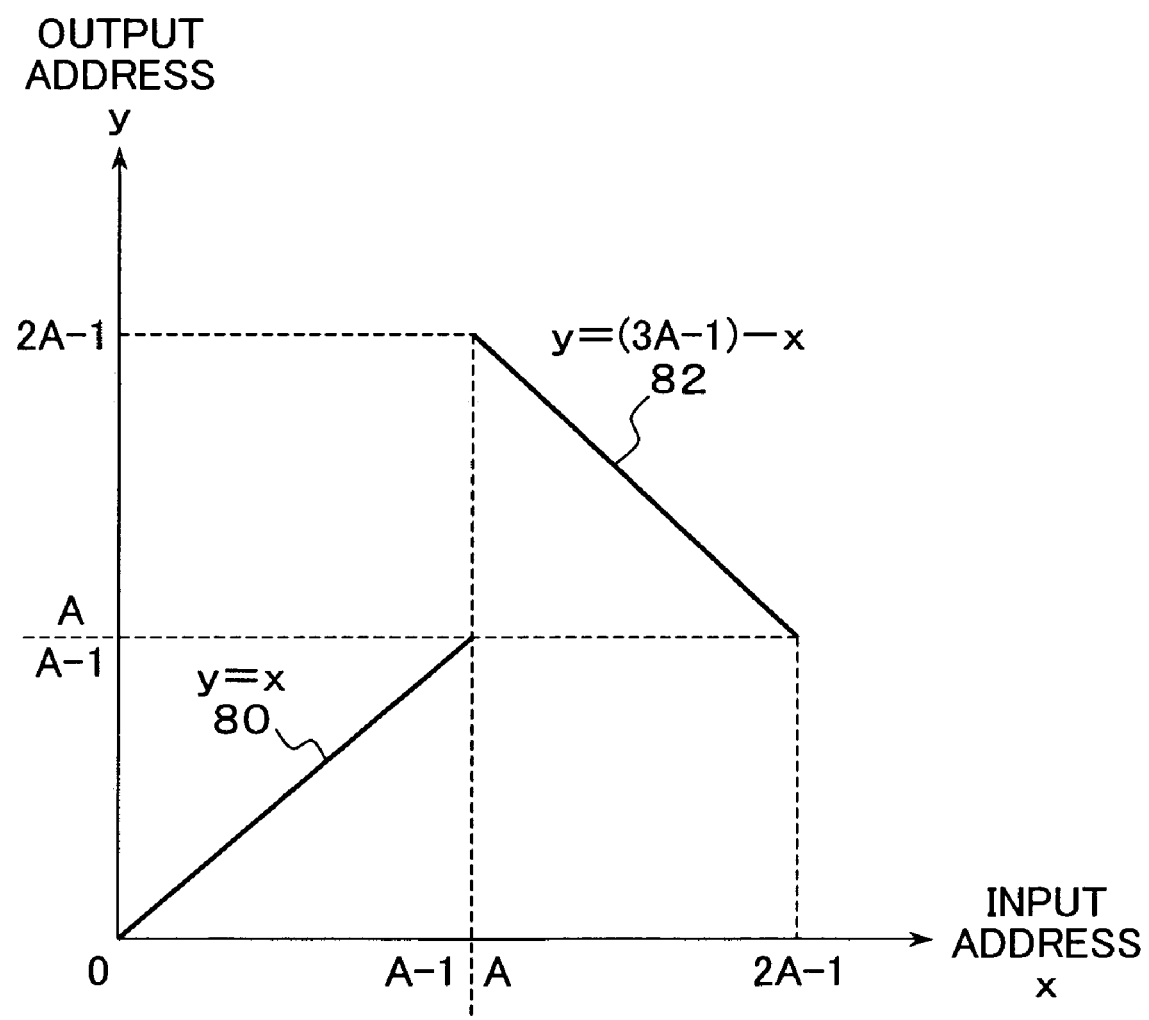
FIG. 9 is a graph of address conversion property of this embodiment.

FIG. 9 is a graph of the address converting property corresponding to the address conversion 78 shown in FIG. 8. In FIG. 9, an output address y serving as an address of the physical volume 76 is determined in correspondence to the input address x given by the logical volume 74. The input address x and the output address y have a size of 0 to 2A-1, where A represents A=10000 with reference to FIG. 8. The input address x=0 to A-1 assumes:

$$y=x$$

as shown by the straight line 80, revealing that the logical volume 74 addresses correspond to the physical volume addresses one to one. In contrast, for the input address x=A to 2A-1, an address conversion is performed in accordance with:

$$y=(3A-1)-x$$

as shown by the straight line 82.

Figure 10:
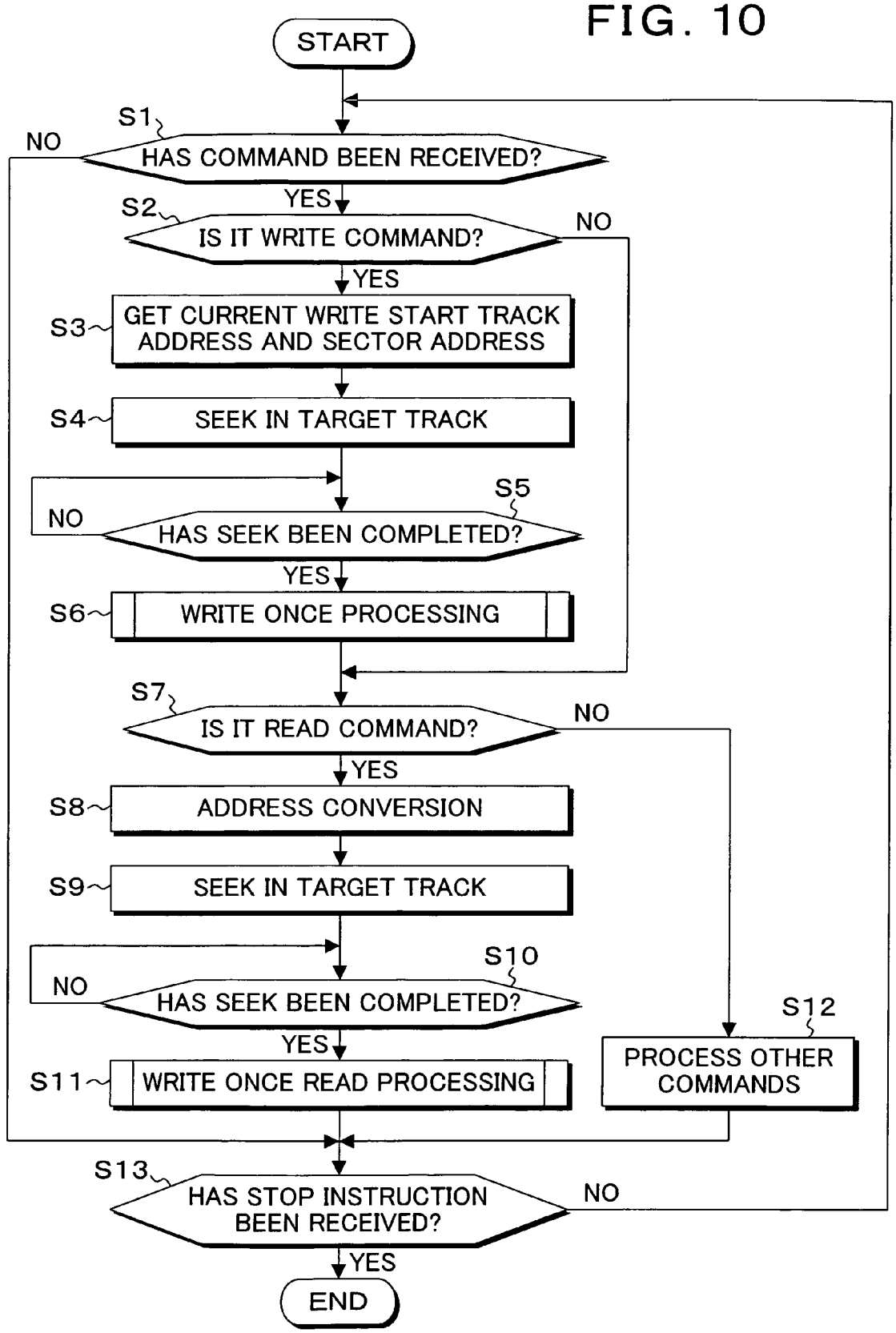
FIG. 10 is a flowchart of the write-once type access processing of this embodiment.

FIG. 10 is a flowchart of the write-once type access processing in this embodiment. In FIG. 10, it is checked in step S1 whether or not a command has been received from the host. Upon receipt of the command, it is determined whether or not it is a write command in step S2. If it is a write command, the process advances to step S3. In step S3, the current write starting track address and the sector address are acquired. In step S4, seeking is performed to the target track serving as the write starting position. Then in step S5, when seek completion is determined, write-once type processing is executed in step S6. If the write-once type write processing is an initial data write as shown in FIG. 3, track writing is started toward the inner side with the outermost track 50-1 as the target track. Upon the completion of write up to the track 50-n adjacent to the 0° yaw angle boundary line 55, the head is moved to the innermost track 50-2n to start writing, and write is performed sequentially from there to the track 50-2n+1 adjacent to the 0° yaw angle boundary line 55. If the received command is not the write command in step S2, the process advances to step S7 to determine whether or not it is the read command. If the read command, after converting the address from the host into an address of the magnetic disk corresponding to the write-once type recording in step S8, seek is performed to the target track in step S9. When the seek completion is determined in step S10, write-once type read is executed in step S11. In this write-once type read processing, head seeking is conducted to the target track in the area in which data have already been written once, and then, the data are read out while sequentially shifting the head in a direction toward a smaller yaw angle. When the command is not the read command in step S7, command processing of the other commands is executed in step S12. This processing is repeated until a stop instruction is received in step S13. The writing operation in the written-once type write processing in step S6 will now be described with reference to FIG. 1. Upon receipt of the write command and the write data from the host in the host interface control unit 34, the write command is decoded by the MPU 26, and the received write data are stored as required in the buffer memory 38. Then, the data are converted into a prescribed data format in the hard disk controller 40. ECC codes are added through an ECC processing, and after conducting a scramble RLL code conversion and further a write compensation in the write modulation system in the read channel, data are written by write-once type recording onto the recording surface of the magnetic disk by using, for example, a recording element of the head 22-1 selected in accordance with an instruction of the MPU 26 from the write amplifier of the head IC 24. At this moment, a head positioning signal is given from the MPU 26 to the motor drive control unit 44. After seeking the head to the target track instructed by the command by means of the voice coil motor 18, the head is brought into on-track state to perform track following control. Upon the completion of write onto all the sectors of the target track, a run of track seeking is performed on the adjacent track on the side with a decreasing yaw angle to repeat writing. On the other hand, the write operation after write-once recording in the write-once type storage apparatus 10 of FIG. 1 is as follows. Upon receipt of the read command from the host into the host interface control unit 34, the read command is decoded by the MPU 26 to cause operation of the read processing unit 48, and head seeking is performed to the target track by the rotary actuator to bring the head into the on-track state. After amplifying the signal read out from the read head element selected by the head select of the head IC 24 in this state by means of the preamplifier embedded in the head IC 24, the amplified signal is entered into the read demodulating system of the read channel 42. The read data is demodulated through partial response maximum likelihood (PRML) detection, and an error, if any, is detected and corrected through an ECC processing applied by the hard disk controller 40. Then, the read data is buffered in the buffer memory 38, and the read data is transferred from the host interface unit 34 to the host.

Figure 11A:
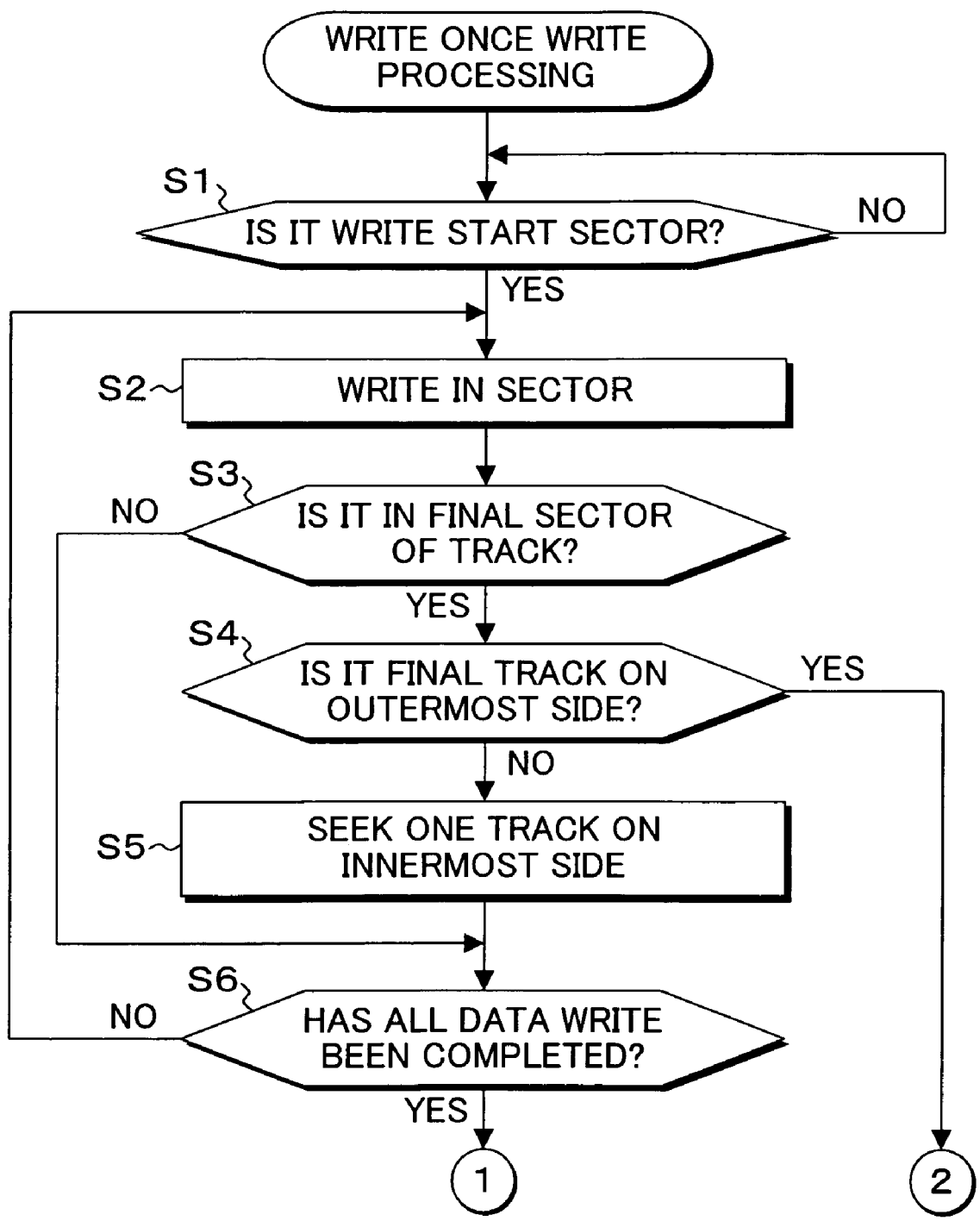
FIGS. 11A and 11B are flowcharts of details of write-once type write processing in step S6 of FIG. 10.
Figure 11B:
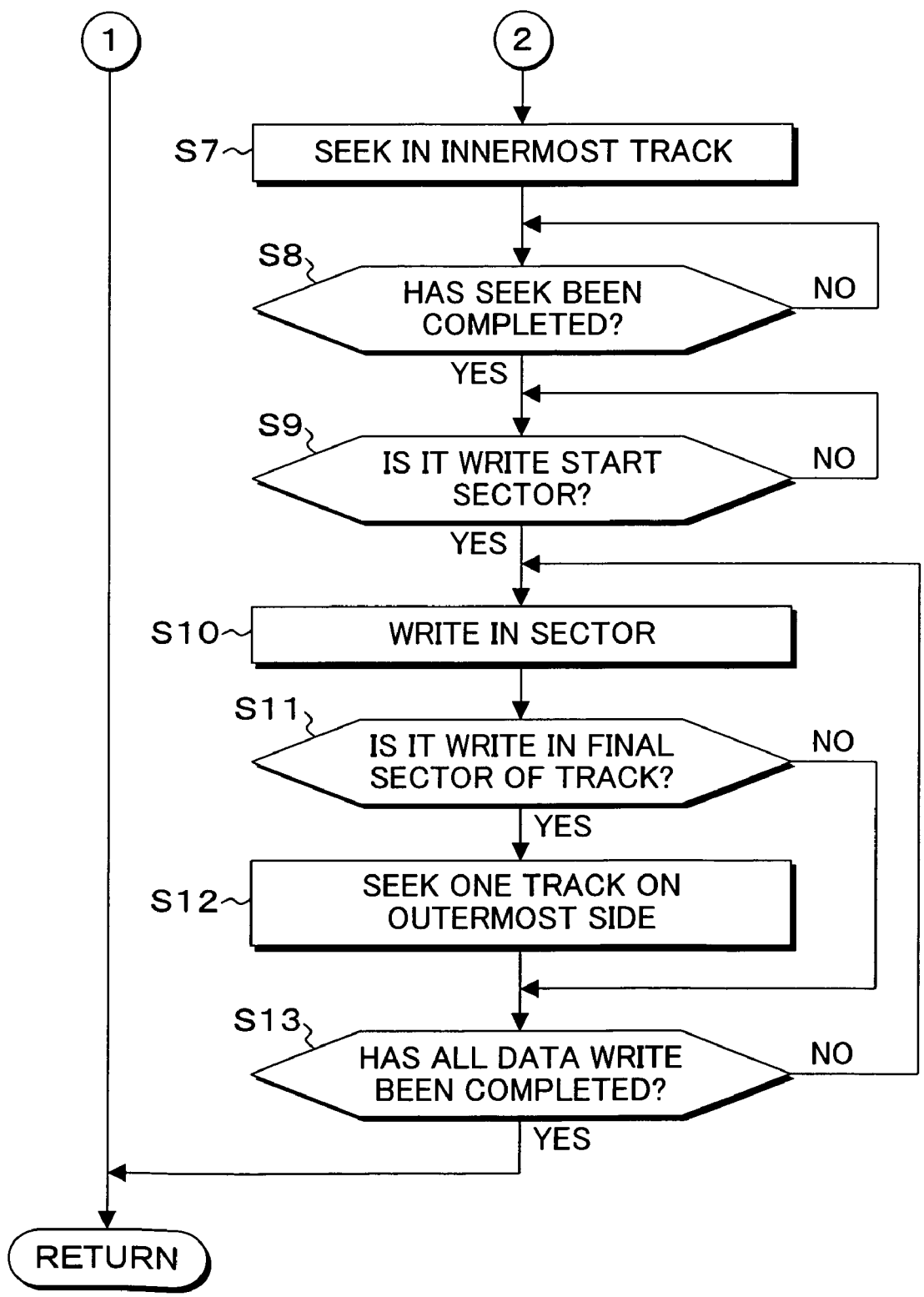

FIGS. 11A and 11B are flowcharts illustrating the details of write-once type write processing in step S6 shown in FIG. 10. In FIGS. 11A and 11B, in the write-once type write processing, it is checked whether or not the sector is the write starting sector in an on-track state after seeking to the target track in step S1. Upon determination of the write starting sector, sector write is executed in step S2. Then in step S3, it is checked if this is the write into the track final sector or not. If not the final sector, it is checked whether or not write of all the data is completed in step S6. If not as yet completed, the process returns to step S2, and sector writing is continued. When write of the track final sector is determined in step S3, it is determined whether or not the track is the final track on the outer side in step S4. If not the final track on the outer side, a run of track seek is performed on the inner side in step S5 to return from step S6 to step S2, and sector writing is executed into the next track. When the completion of write for all the data is determined during write into tracks on the outer side in these steps S2 to S6, a series of write-once write processing is completed to return to FIG. 10. When the completion of write of the final track on the outer side during track write on the outer side is determined in step S4, the process advances to step S7, and the head seeking is performed to the innermost track. If seek completion is determined in step S8, it is checked whether or not it is the write starting sector in step S9. If the write starting sector is determined, sector write is started from the top sector of the innermost track in step S10. Then in step S11, it is checked whether or not it is write in the final sector of the track in step S11. If the final sector of track, the head seeking is conducted by a track on the outer side in step S12. When the completion of write of all the data is determined in step S13, the process returns to FIG. 10.

Figure 12A:
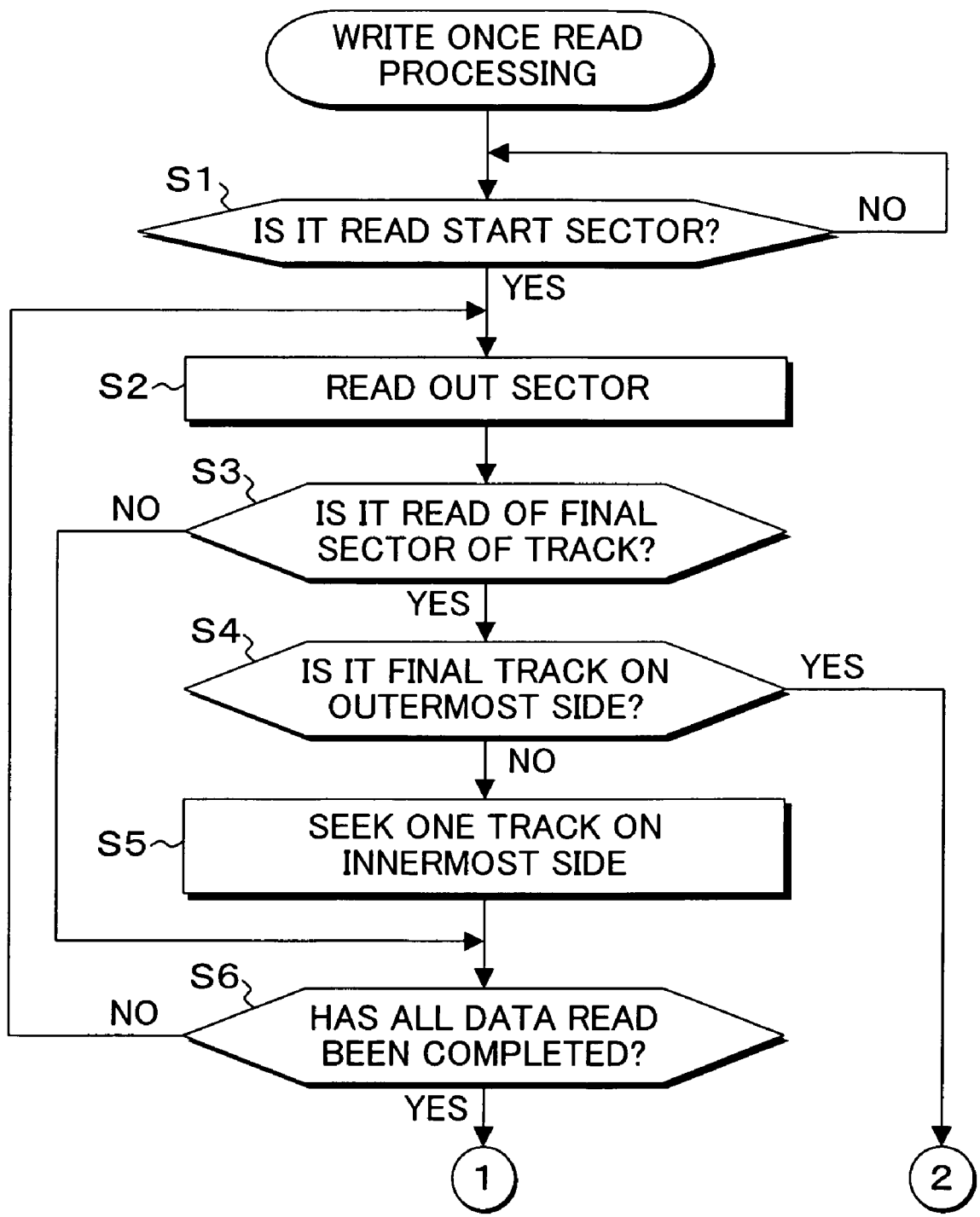
FIGS. 12A and 12B are flowcharts illustrating details of write-once type read processing in step S11 of FIG. 10.
Figure 12B:
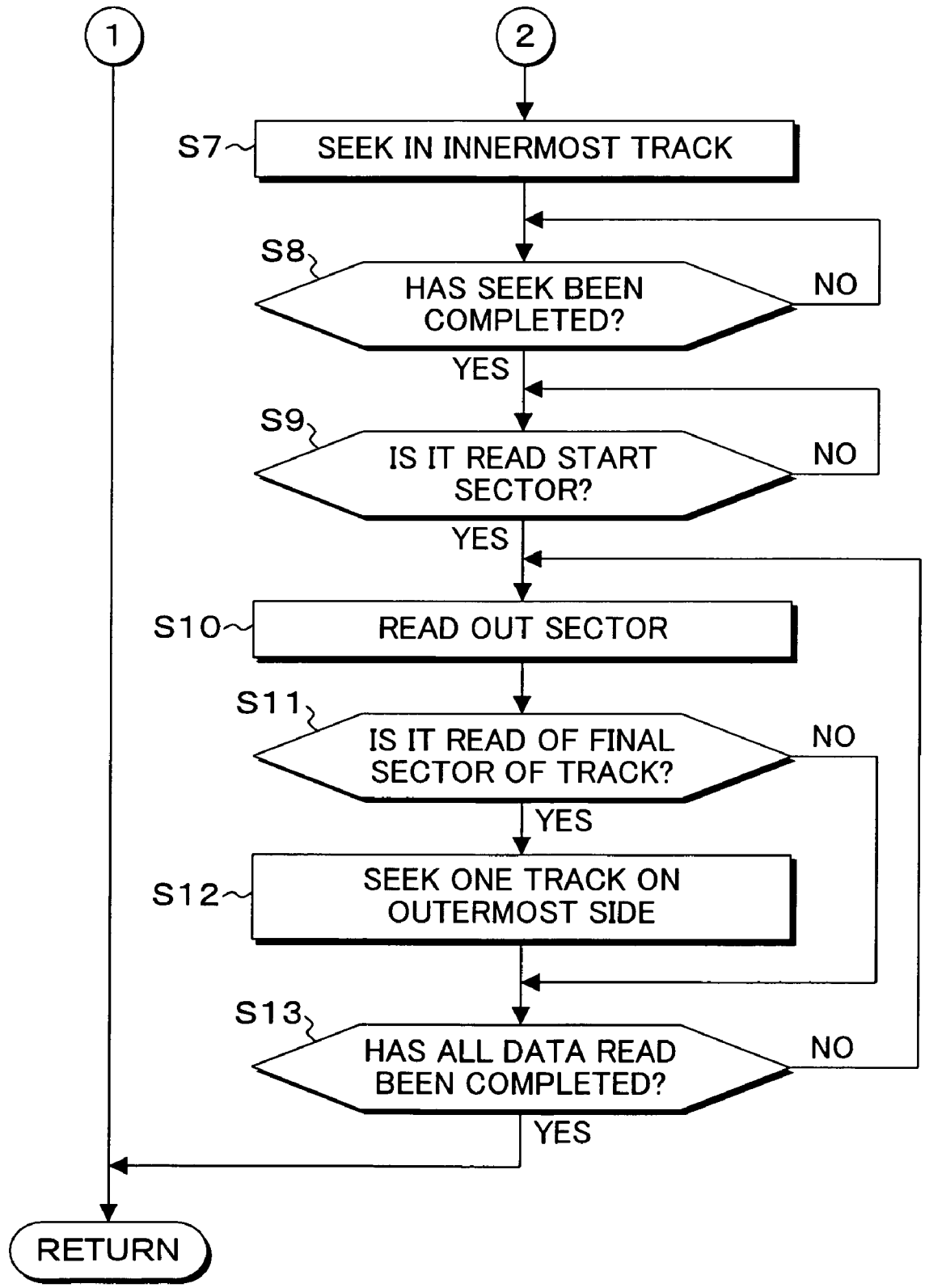

FIGS. 12A and 12B are flowcharts illustrating details of the write-once type read processing in step S11 shown in FIG. 10. In FIGS. 12A and 12B, the write-once type read processing comprises starting sector read in step S2 when the read starting sector is determined in step S1. Then in step S3, it is checked whether or not read of the final sector of track. If read of the final sector, it is determined whether or not it is the final track on the outer side in step S4. If not the final track, the head seeking is executed by a track on the inner side in step S5. This is repeated in step S6 until the completion of read of all the data. When the final track on the outer side is determined in step S4 during read on the outer side in steps S2 to S6, the process advances to S7 and the head seek is conducted to the innermost track. When the seek completion is determined in step S8, the read starting sector which is the top sector of the innermost track is determined in step S9, and sector read is started in step S10. When read of the first sector of track is determined in step S11 during read of sector, seeking is carried out by one track on the outer side in step S12. Processing in step S10 and the subsequent steps is repeated until completion of read of all the data is determined in step S13. Upon determination of completion of read of all the data, the process returns to FIG. 10.

Figure 13:
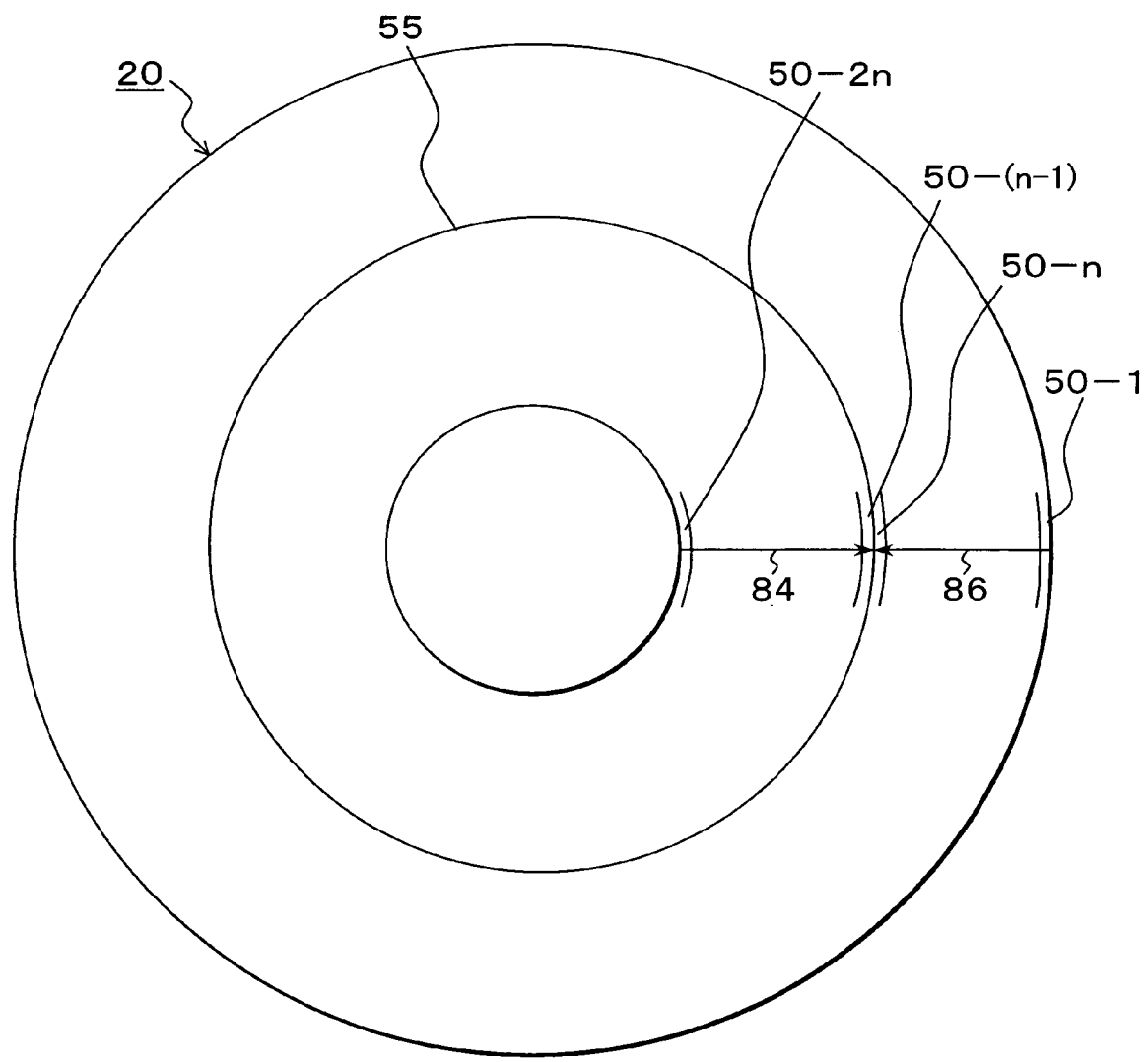
FIG. 13 is a descriptive view of another embodiment in which write is started at the innermost track.

FIG. 13 is a descriptive view of another embodiment in which read for write-once recording is started from the innermost track. In the embodiment shown in FIG. 13, the innermost track 50-2n giving the largest yaw angle is used as the initial recording track, and the data are written sequentially toward the track 50-(n+1) adjacent to the 0° yaw angle boundary line 55 giving a yaw angle of 0°. Upon completion of read on the inner side, head seek is made to the outermost track 50-1 giving the largest yaw angle, and then, the data are written sequentially toward the track 50-n adjacent to the 0° yaw angle boundary line 55.

Figure 14:
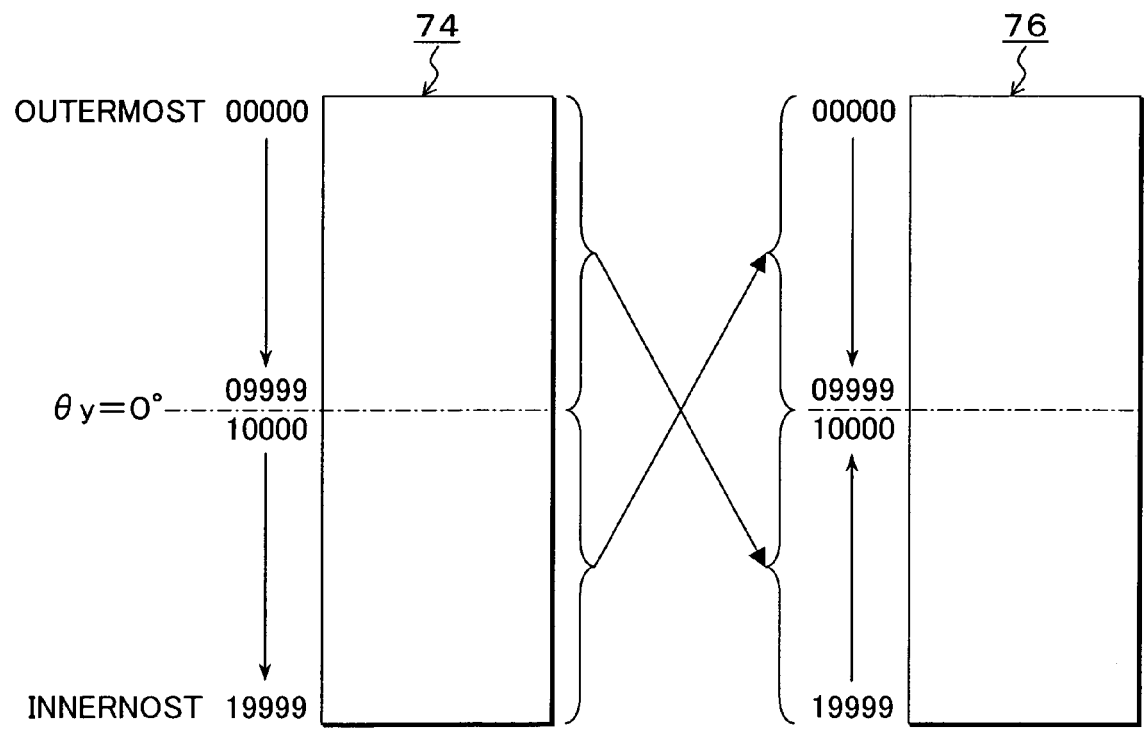
FIG. 14 is a descriptive view of address conversion corresponding to FIG. 13.

FIG. 14 is a descriptive view of address conversion corresponding to the embodiment shown in FIG. 13. The outer side track addresses "00000 to 09999" of the logical volumes 74 are address-converted into track addresses "19999 to 10000" on the physical volume 76 side. The inner side addresses "10000 to 19999" of the logical volumes 74 are address-converted into outer side track addresses "00000 to 09999" for the physical volumes 76.

Figure 15:
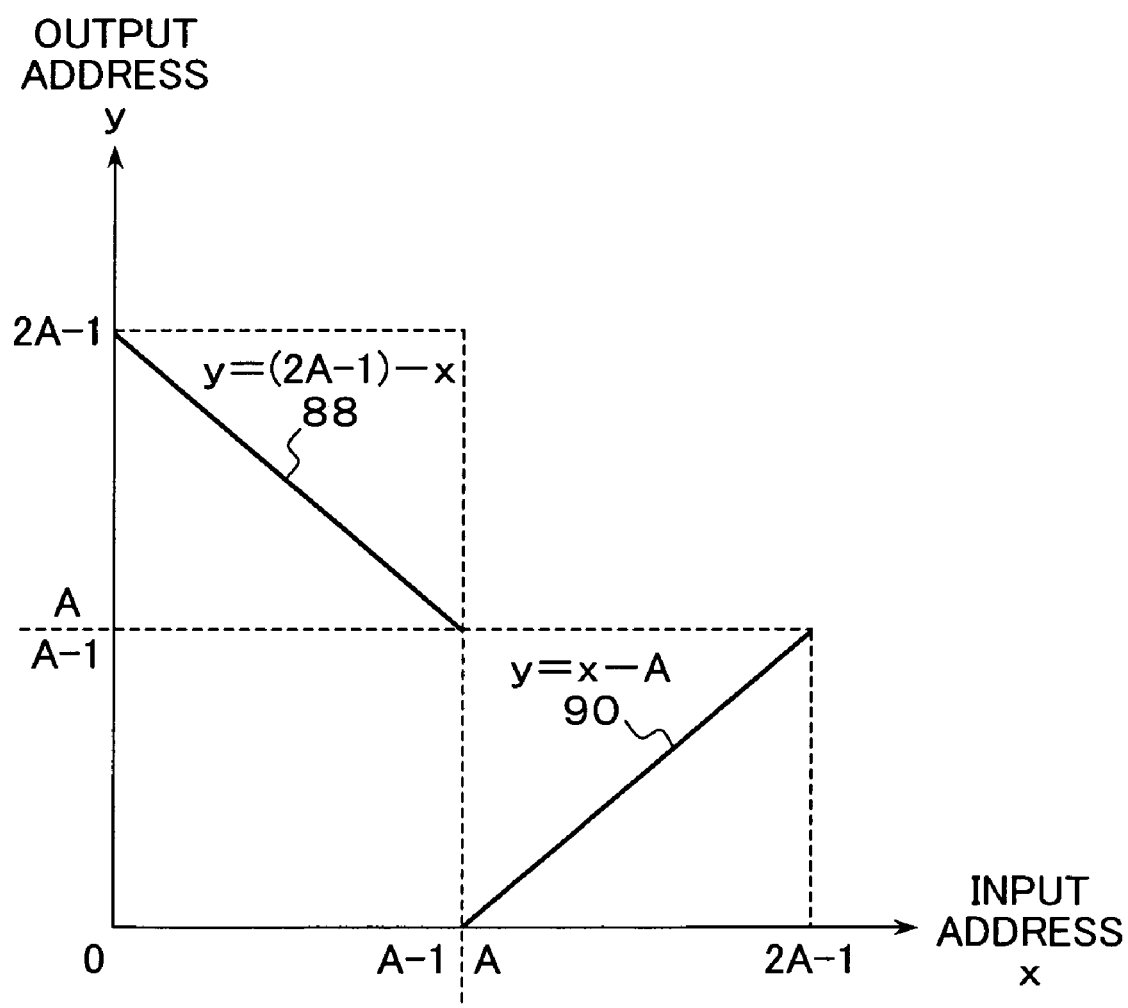
FIG. 15 is a graph of address conversion property corresponding to FIG. 14.

FIG. 15 is a graph of address conversion property corresponding to FIG. 14. Address conversion is accomplished in accordance with:

$$y=(2A-1)-x$$

for an input address x corresponding to the logical volume 74, and for x=0 to A−1, relative to the straight line 88, where, in the case of FIG. 15, A=10000. For an input address x=A to 2A−1, address conversion is carried out, relative to the straight line 90, in accordance with:

$$Y=x-A.$$

Figure 16:
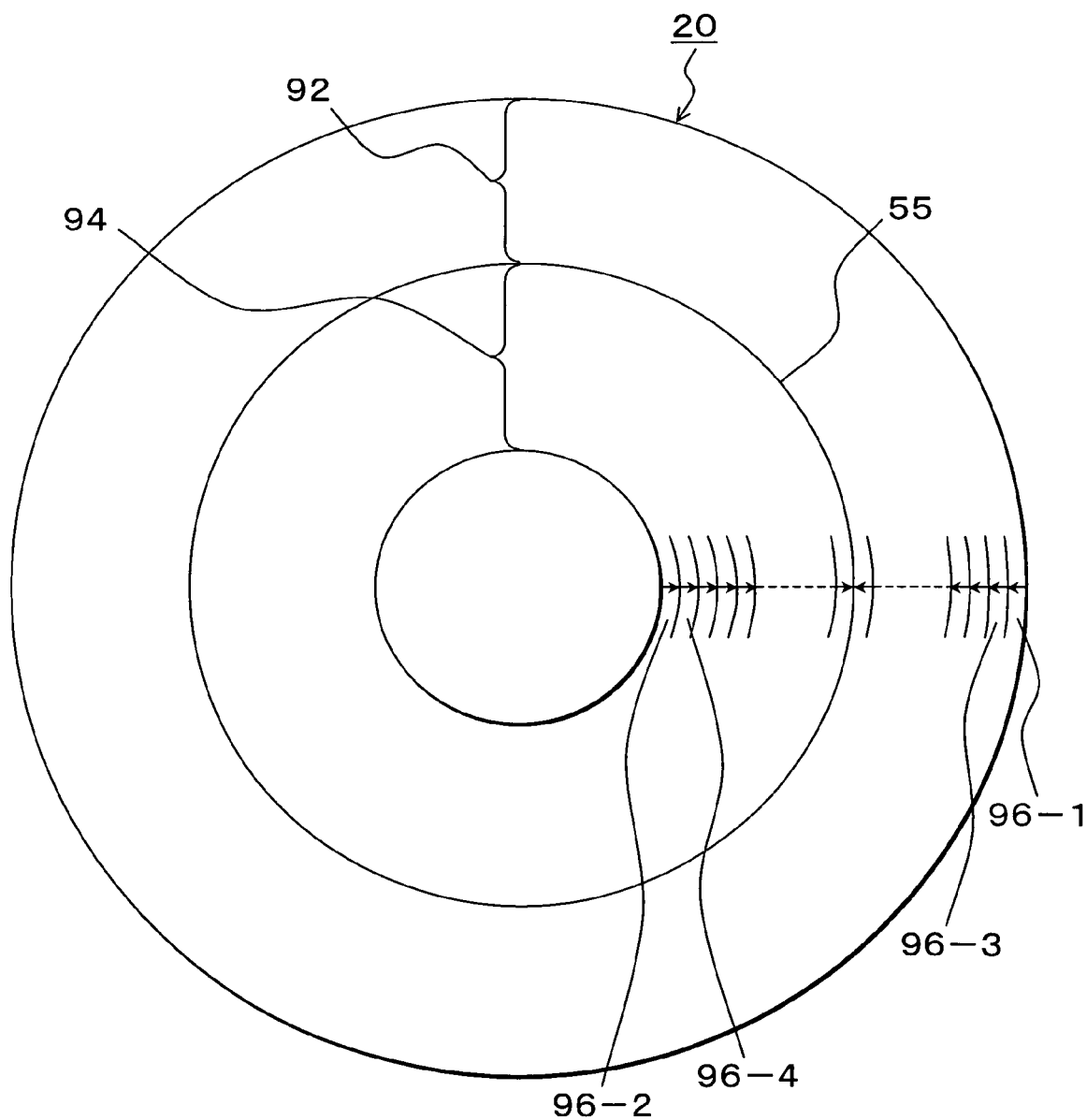
FIG. 16 is a descriptive view of still another embodiment in which read is conducted by selecting a track alternately in the order of the outer zone and then the inner zone.

FIG. 16 is a descriptive view of another embodiment in which a track is selected alternately in the sequence of the outer zone and then the inner zone for writing. In the embodiment of FIG. 16, the recording track area of the magnetic disk 20 is divided into an outer zone 92 and an inner zone 94 with the 0° yaw angle boundary line 55 as the boundary. Tracks of the outer zone and the inner zone are alternately and sequentially selected and data are written from the track giving the largest yaw angle toward the track giving a yaw angle of 0° for write-once recording. More specifically, data is written first into the outermost track 96-1; secondly, data is written into the innermost track 96-2; thirdly, data is written into an outer side track 96-3; then write is made into an inner side track 96-4; and this is repeated similarly thereafter.

Figure 17:
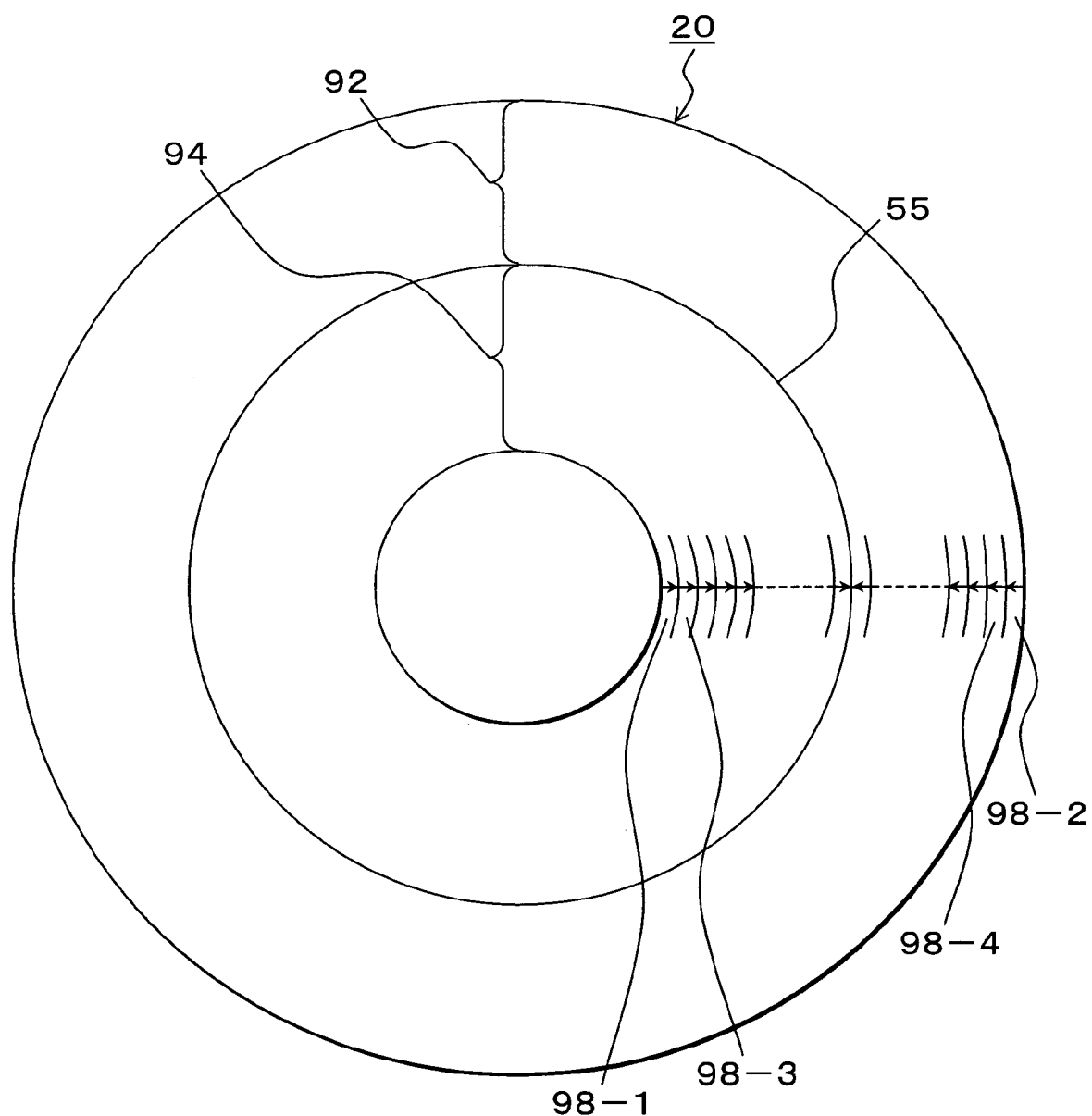
FIG. 17 is a descriptive view of further another embodiment in which read is conducted by selecting a track alternately in the order of the outer zone and then the inner zone.

FIG. 17 is a descriptive view of still another embodiment in which a track is selected alternately in the sequence of the outer zone and then the inner zone for writing. In FIG. 17, the magnetic disk 20 is divided into an outer zone 92 and an inner zone 94 with the 0° yaw angle boundary line 55 as the boundary. In the case of this embodiment, data is written first into the innermost track 98-1; then data is written into the innermost track 98-2; then write is performed into an inner side track 98-3; then, the data is written into an outer side track 98-4; and thereafter this is repeated.

Apart from the above, the present invention provides a program to be executed by the MPU 26 in the write-once type storage apparatus 10 shown in FIG. 1. The details of this program are illustrated in the flowcharts of FIGS. 10, 11A, 11B, 12A and 12B.

The above-mentioned embodiments have covered a case of write-once recording in which data is written sequentially from a track giving the largest yaw angle toward a track giving a yaw angle of 0°. The present invention is however applicable as it is, apart from this continuous recording, to write-once recording based on random recording which records data sequentially from a track giving a larger yaw angle toward a track giving a decreasing yaw angle adjacent thereto.

While the above-mentioned embodiments have covered a write-once recording of a hard disk drive having a magnetic disk as a recording medium, the present invention is applicable as it is to an appropriate storage apparatus so far as it is a storage apparatus using a rotary actuator causing a yaw angle upon positioning the head relative to the disk medium.

The present invention involves appropriate variations without impairing the objects and advantages thereof, and is not limited by the numerical values shown in the above-mentioned embodiments.

What is claimed is:

1. A write-once type storage apparatus which supports a head having a recording element and a reading element at the leading end of a rotary actuator, and after writing once information by said head into a disk medium, reproduces the once written information, comprising:

a write processing unit which sequentially writes information from a track for which the yaw angle of said actuator in the recording track area of said disk medium becomes the largest toward a track for which the yaw angle becomes 0°; and a read processing unit which reads out the information write-once-written into said disk medium from a track giving a large yaw angle toward a track giving a decreasing yaw angle and wherein said write processing unit writes information at the smallest track pitch at which the error rate or the mismatch number of the data read out by said read processing unit from the track having the largest yaw angle becomes smaller than a prescribed threshold value.

2. The write-once type storage apparatus according to claim 1, wherein said write processing unit writes information sequentially from the outermost track of said disk medium toward a track giving a yaw angle of 0°, and then writes information sequentially from the innermost track toward a track giving a yaw angle of 0°.

3. The write-once type storage apparatus according to claim 1, wherein said write processing unit writes information sequentially from the innermost track of said disk medium toward a track giving a yaw angle of 0°, and then writes information sequentially from the outermost track toward a track giving a yaw angle of 0°.

4. The write-once type storage apparatus according to claim 1, wherein said write processing unit divides the recording track area of said disk medium into an outer zone and an inner zone with a yaw angle of 0° as a boundary, alternately selects sequentially tracks of said outer zone and inner zone and write information from the track giving the largest yaw angle toward a track giving a yaw angle of 0°.

5. A control method of a write-once type storage apparatus which supports a head having a recording element and a reading element on a leading end of an actuator, and after once writing information into a disk medium by said head, the information is reproduced, comprising:
   a write processing step of writing information sequentially from a track giving the largest yaw angle of said actuator in the recording track area of said disk medium to a track giving a yaw angle of 0°; and
   a read processing step of reading out the information write-once-written in said disk medium from the track of a larger yaw angle to the track of a decreasing yaw angle; and
   wherein said write processing step writes information at the smallest track pitch at which the error rate or the mismatch number of the data read out by said read processing unit from the track having the largest yaw angle becomes smaller than a prescribed threshold value.

6. The control method of a write-once type storage apparatus according to claim 5, wherein said write processing step comprises writing information sequentially from the outermost track of said disk medium toward a track giving a yaw angle of 0°, and then writing information sequentially from the innermost track toward a track giving a yaw angle of 0°.

7. The control method of a write-once type storage apparatus according to claim 5, wherein said write processing step comprises writing information sequentially from the innermost track of said disk medium toward a track giving a yaw angle of 0°, and then writing information sequentially from the outermost track toward a track giving a yaw angle of 0°.

8. The control method of a write-once type storage apparatus according to claim 5, wherein said write processing step comprises dividing the recording track area of said disk medium into an outer zone and an inner zone with a yaw angle of 0° as a boundary, alternately selecting sequentially tracks of said outer zone and inner zone and writing information from the track giving the largest yaw angle toward a track giving a yaw angle of 0°.

9. A record control circuit which controls information recording on a disk medium by a head supported by a rotary actuator, comprising:
   a write processing unit which writes information sequentially from a track giving the largest yaw angle of said actuator in the recording track area of said disk medium to a track giving a yaw angle of 0°; and
   a read processing unit which reads out the information write-once-written in said disk medium from the track of a larger yaw angle to the track of a decreasing yaw angle; and
   wherein said write processing unit writes information at the smallest track pitch at which the error rate or the mismatch number of the data read out by said read processing unit from the track having the largest yaw angle becomes smaller than a prescribed threshold value.

10. The record control circuit according to claim 9, wherein said write processing unit writes information sequentially from the outermost track of said disk medium toward a track giving a yaw angle of 0°, and then writes information sequentially from the innermost track toward a track giving a yaw angle of 0°.

11. The record control circuit according to claim 9, wherein write processing unit writes information sequentially from the innermost track of said disk medium toward a track giving a yaw angle of 0°, and then writes information sequentially from the outermost track toward a track giving a yaw angle of 0°.

12. The record control circuit according to claim 9, wherein said write processing unit divides the recording track area of said disk medium into an outer zone and an inner zone with a yaw angle of 0° as a boundary, alternately selects sequentially tracks of said outer zone and inner zone and writes information from the track giving the largest yaw angle toward a track giving a yaw angle of 0°.

* * * * *